(12) United States Patent
Nishumura et al.

(10) Patent No.: US 7,232,261 B1
(45) Date of Patent: Jun. 19, 2007

(54) OPTICAL FERRULE AND MOLDING METHOD THEREFOR, AND OPTICAL CONNECTOR USING THIS OPTICAL FERRULE

(75) Inventors: Akito Nishumura, Sakura (JP); Toru Arikawa, Sakura (JP); Yasuhiro Tamaki, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 09/720,235

(22) PCT Filed: Apr. 20, 2000

(86) PCT No.: PCT/JP00/02582

§ 371 (c)(1),
(2), (4) Date: Dec. 20, 2000

(87) PCT Pub. No.: WO00/65392

PCT Pub. Date: Nov. 2, 2000

(30) Foreign Application Priority Data

Apr. 23, 1999 (JP) .................................. 11-115867
Mar. 30, 2000 (JP) ............................ P2000-095908

(51) Int. Cl.
*G02B 6/36* (2006.01)
(52) U.S. Cl. ...................................................... 385/78
(58) Field of Classification Search ................. 385/64, 385/82, 52, 77, 78
See application file for complete search history.

(56) References Cited

U.S. PATENT DOCUMENTS 4,911,518 A * 3/1990 Miller ........................... 385/78
5,381,500 A * 1/1995 Edwards et al. ............... 385/78
5,923,803 A * 7/1999 Bunin et al. ................... 385/80
5,975,770 A * 11/1999 Yanagi et al. .................. 385/78

FOREIGN PATENT DOCUMENTS

EP 0938003 8/1999

(Continued)

OTHER PUBLICATIONS

Satake, et. al., "US Conec Spreads MT Connector Into North Amenrican Markets". NTT Review, Telecommunucations Association, Tokyo Japan. vol. 5, No. 4, Jul. 1, 1993, pp. 82-89.

(Continued)

*Primary Examiner*—Javaid H. Nasri
(74) *Attorney, Agent, or Firm*—Chadbourne & Parke LLP

(57) ABSTRACT

An optical ferrule is disclosed in which a concave portion 17c having a gate G in resin molding disposed therein is formed in a ferrule body 11. According to this constitution, it is possible to easily cut a flash 10 left after a gate of the concave portion 17c of the ferrule body 11 is cut after molding with a gate cutter, so that, when the ferrule body 11 is fitted in a housing of an MPO connector and the like, the problem that the flash 10 protrudes from the concave portion 17c and the flash 10 hitching to an inner wall of the housing dose not occur. Accordingly, the labor required for removing the flash 10 by polishing can be eliminated, and hence productivity of the ferrule body 11 can be improved. Thus, a large number of ferrule bodies 11 can be automatically manufactured without requiring much manpower.

12 Claims, 16 Drawing Sheets

FOREIGN PATENT DOCUMENTS

| | | |
|---|---|---|
| JP | 56 074212 | 6/1981 |
| JP | 57 067906 | 4/1982 |
| JP | 61 137109 | 6/1986 |
| JP | 63-16112 | 2/1988 |
| JP | 02 016021 | 1/1990 |
| JP | 4-77419 | 7/1992 |
| JP | 7-56054 | 3/1995 |
| JP | 07-56054 | 3/1995 |
| JP | 11-72651 | 3/1999 |
| WO | WO99/05553 | 2/1999 |

OTHER PUBLICATIONS

European Search Report, European Patent Office, Dec. 27, 2006.
Y. Tamaki et al., "Field-Installable Plastic Multifiber Connector", J. Lightwave Technol., vol. LT-4, No. 8 (Aug. 1986) pp. 1248-1254.

\* cited by examiner

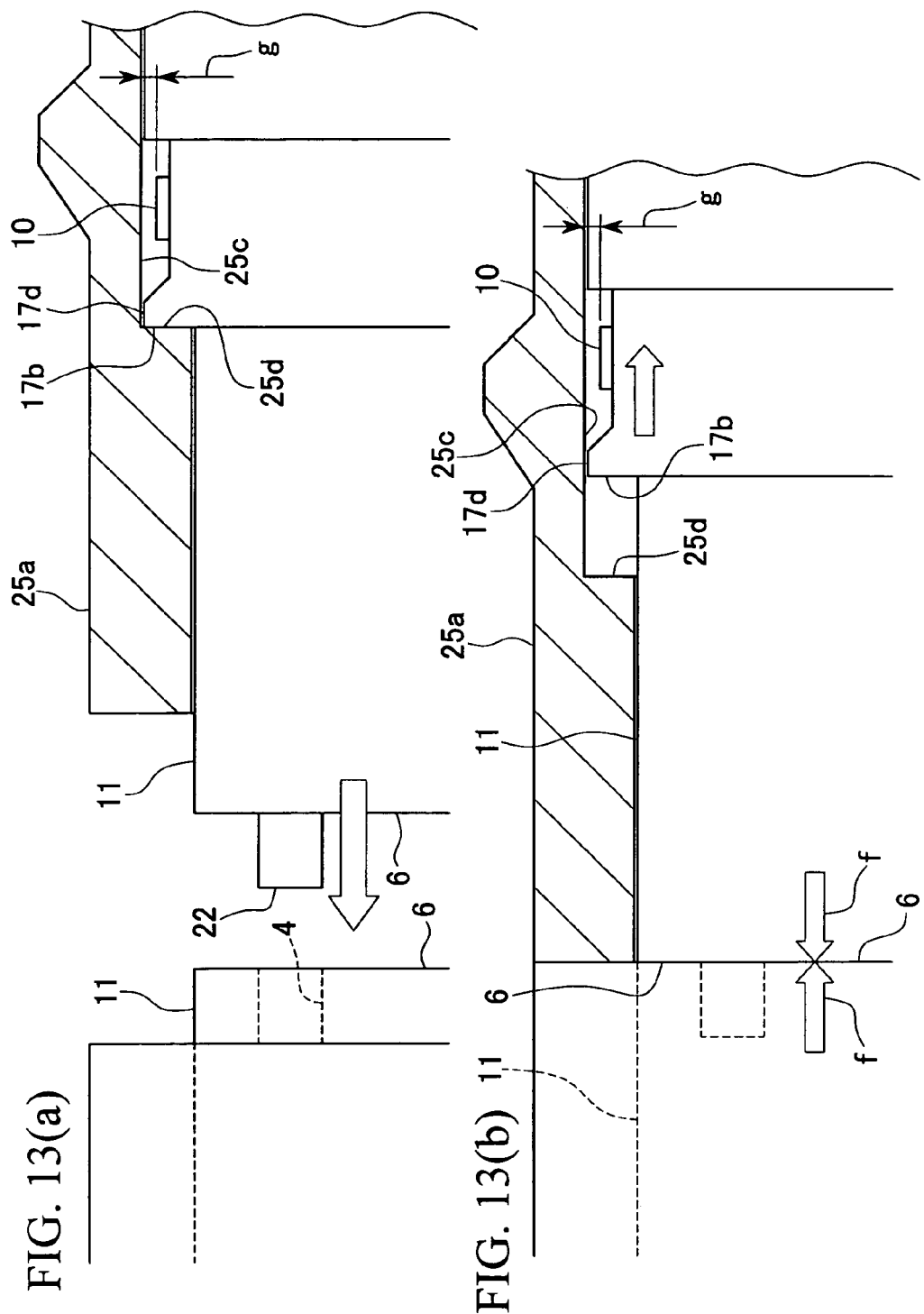

OPTICAL FERRULE AND MOLDING METHOD THEREFOR, AND OPTICAL CONNECTOR USING THIS OPTICAL FERRULE

BACKGROUND OF THE INVENTION

1. Field of the Invention

The present invention relates to an optical ferrule and a method of molding the same, and to an optical connector using the same.

2. Descriptions of the Related Arts

As an optical connector for connecting multi-core optical fibers collectively, an optical connector adopting a pin inserting positioning system, which is called an MT type optical connector and which corresponds to an optical ferrule for use in an optical connector, which is used for an F12 type multi-core optical fiber connector according to JIS C 5981, is known as shown in FIGS. 17 and 18, the conventional optical ferrule 1 (hereinafter referred to as a ferrule 1 for use in an optical connector), which is used as such a kind of MT type optical connector, is a plastic molded article taking a rectangular shape, in which an optical fiber insertion opening portion 2, an optical fiber insertion hole 3, a guide pin hole 4 and an adhesive pouring window 5 are formed, and which has a structure with a square-shaped flange portion 7 provided on the opposite side (right side of FIG. 17) to a connector connecting end face 6. A naked optical fiber (not shown) from which a cover is detached is inserted in the optical fiber insertion hole 3, and fixed thereto with adhesive. Note that reference numeral 8 shown in FIG. 17(*c*) denotes a rubber boot for protecting the mouth of the inserted multi-core optical fiber.

Molding of the ferrule 1 for use in an optical connector is performed by use of transfer molding and injection molding depending on molding resin to be used. In a metal mold, a gate for injecting molten resin is usually located on a side surface 7a of the flange portion 7. The position of the gate is illustrated by reference symbol G in FIG. 18. Accordingly, when the metal mold after molding is opened to take out the ferrule 1 for use in an optical connector that is a molded article and the gate G is simply cut with a gate cutter, the gate G remains as a flash on the side surface 7a of the flange portion 7.

Incidentally, an optical connector (not shown) adopting a plug-adapter-plug system, which corresponds to an F13 type multi-core optical fiber connector according to JIS C 5982, has been known as a so-called an MPO optical connector. In the optical connector, a plug (optical connector) constructed by accommodating the ferrule 1 for use in an optical connector in a housing is connected thereto so as to interpose an adapter therebetween. Since the ferrule 1 for use in an optical connector enters a hollow portion of the housing in using the ferrule 1 for use in an optical connector for this MPO optical connector, the flash remaining in the gate G of the flange portion 7 must be removed. Specifically, in the state where such flash remains, the flash acts as a hitching member, thus making it impossible for the ferrule 1 for use in an optical connector to be inserted in the housing. Alternatively, even though the ferrule 1 for use in an optical connector can be inserted therein, the flash is caught by the inner wall of the housing, and there is the concern that the ferrule 1 for use in an optical connector cannot slide in the housing smoothly owing to friction caused by hitching of the flash on the inner wall of the housing. Since this flash cannot be removed by sandblasting, a step for polishing the flash is provided, and the flash of the gate G is usually removed by polishing the side surface 7a of the flange portion 7. However, polishing of all of the many ferrules 1 for use in an optical connector has been significantly troublesome. Furthermore, a polishing apparatus exclusively used for polishing the optical connector-use ferrule is needed.

Accordingly, the present invention was made to overcome the disadvantages of such conventional optical connector-use ferrules. The object of the present invention is to provide an optical ferrule capable of saving the labor for removing the flash which remains on the gate in resin molding, and of automatically manufacturing a large number of optical connector-use ferrules without requiring much manpower, and a method of molding the same. Another object of the present invention is to provide an optical connector using the optical ferrule.

DISCLOSURE OF THE INVENTION

An optical ferrule of the present invention has the feature that in a concave portion, a gate in resin molding therein is formed in a ferrule body. According to this constitution of the optical ferrule, a flash which remains after a gate in the concave portion of the optical ferrule that is a molded article after molding is cut by a gate cutter, can be cut readily so as not to protrude to the outside from an opening portion of the concave portion. When the optical ferrule is accommodated, for example, in the housing of an MPO optical connector, the problem that the flash protrudes from the concave portion and the housing is hitched by the flash never occurs. Therefore, labor for removing the flash by polishing can be saved, and thus productivity of the optical ferrule can be increased, so that it is possible to automatically produce a large number of optical ferrules without requiring much manpower.

The optical ferrule of the present invention can also have the feature that, as the formation position of the concave portion, it is possible to select any one of the right and left side surfaces of the external periphery surface of the flange portion or both of them, or it is possible to select any one of the upper and lower surfaces of the external periphery surface of the flange portion or both of them. The gate must be located at a suitable position in the optical ferrule in consideration of the flow (orientation) of the resin in a metal mold. Specifically, some residual stress occurs in the resin during its cure shrinkage, and the strain becomes large when the optical ferrule is not designed so as to provide an optimum gate position. As a result, there is the concern that warping and cracks may occur. The provision of the gate in the flange portion as in the present invention is preferable from the viewpoint of the above circumstances.

The optical ferrule of the present invention can also have the feature in that when any one of the right and left side surfaces of the external periphery surface of the flange portion is selected in forming the concave portion, the concave portion is formed so as to extend from any one of the side surfaces to a rear end corner portion, and a linear dimension in a connector connecting direction at a portion other than that from any one of the side surfaces to the concave portion is set to 0.3 mm or more. According to this constitution, when the optical ferrule is accommodated in the housing of, for example, an MPO optical connector, the reservation of a linear dimension of 0.3 mm or more in the connector connecting direction makes it possible for a portion of the optical ferrule sliding on an inner wall of the housing to function as a guide in the sliding direction. Consequently, it is possible to prevent a tip portion, where a connector connecting end face is formed, from deflecting in the foregoing right and left directions relative to the connector connecting direction, and the accommodation position of the optical ferrule in the housing can be stably secured.

Furthermore, the optical ferrule of the present invention makes it possible to also adopt a constitution in which the concave portion is formed between both corner portions of the foregoing side surface. According to this constitution, when this optical ferrule is accommodated in the housing of, for example, the MPO optical connector, the foregoing two corner portions, which slide on the inner wall of the housing, can function as a guide in a sliding direction. Accordingly, both of the corner portions can function as the long guide in the sliding direction substantially over the whole length of the connector connecting direction on the side surface of the flange portion, which connects between both of the corner portions. Thus, it is possible to more effectively prevent the tip portion, where the connector connecting end face is formed, from deflecting in the right and left direction relative to the connector connecting direction, and the accommodation position of the optical ferrule in the housing can be more stably secured.

Furthermore, the optical ferrule of the present invention makes it possible to also adopt a constitution in which the concave portion formed in any one of the right and left side surfaces or both of them, or formed in any one of the upper and lower surfaces or both of them, is formed in a groove shape extending over the whole length of the flange portion along the connector connecting direction.

The optical ferrule of the present invention has a feature in that within the ferrule body there are formed: an optical fiber insertion opening portion serving as an insertion port for the optical fiber; an optical fiber insertion hole opened in a connector connecting end face, the optical fiber insertion hole inserting and positioning the optical fiber; and a hole for a guide pin thereto hole for inserting a guide pin for positioning the ferrule body relative to another ferrule body. Particularly, the optical ferrule of the present invention is suitably used in a state wherein the ferrule of the present invention is accommodated in a housing of an optical connector.

The optical ferrule of the present invention can adopt also a constitution in which a concave portion, which is related to a material of a ferrule or confirmation factors such as sorts of optical fibers built therein. As the position of formation of the concave portion in this case, the concave portion should be formed in a flange portion of the ferrule body, and a gate in resin molding should be disposed in the concave portion. According to this constitution, the material of the ferrule body and the confirmation factors such as the sorts of optical fibers built therein can be confirmed by confirming the concave portion.

The optical connector of the present invention has a feature that it uses any of the optical ferrules described above. According to this constitution, effects which the optical ferrule possesses can be exerted. It is possible to adopt an optical ferrule in which a concave portion is formed in other portions than a flange portion in addition to the flange portion, and, as a matter of course, an optical connector comprising this optical ferrule can be adopted.

The method of molding an optical ferrule of the present invention has the feature that a metal mold for forming a ferrule body is used, the ferrule body having a concave portion disposed thereon, in which a gate is disposed in the resin molding, and resin is injected from the gate. According to this molding method, a flash, which is left after the gate of the concave portion in the optical ferrule that is a molded article after molding, can be easily cut so as to have a height lower than an opening portion of the concave portion. Accordingly, when the optical ferrule is fitted into a housing of, for example, an MPO optical connector, the problem that the flash protrudes from the concave portion and the housing is hitched by the flash does not occur. Therefore, the labor required to remove this flash by polishing can be saved, and the productivity for manufacturing the optical ferrules can be increased, so that a large number of optical ferrules can be automatically manufactured without requiring much manpower.

The method of molding an optical ferrule of the present invention may also have the feature that the following are molded by the metal mold: a flange portion which is disposed in a rear end portion opposite to a connector connecting end face so as to protrude to the outside from an external periphery surface of the ferrule body; and the concave portion disposed in an external periphery surface of the flange portion. Then, the method of molding an optical ferrule has the feature in that as a formation position of the concave portion in the external periphery surface of the flange portion, any one of the right and left side surfaces of the external periphery surface of the flange portion or both of them can be selected, or any one of the upper and lower surfaces of the external periphery surface of the flange portion or both of them can be selected. The gate must be located at a suitable position in the optical ferrule in consideration of the flow (orientation) of the resin in a metal mold. Specifically, some residual stress occurs in the resin during its cure shrinkage, and the strain becomes large when the optical ferrule is not designed so as to provide an optimum position of the gate. As a result, there is the concern that warping and cracking may occur. The provision of the gate in the flange portion as in the present invention is preferable from the viewpoint of the above circumstances.

The method of molding an optical ferrule of the present invention may also have the feature that when any one of the right and left side surfaces of the external periphery surfaces of the flange portion is selected in forming the concave portion, the concave portion is molded so as to extend from the side surface to a rear end corner portion, and the linear dimension in a connector connecting direction at a portion other than that from the side surface to the concave portion is set to 0.3 mm or more. According to this molding method, when the optical ferrule is accommodated in the housing of, for example, an MPO optical connector, the reservation of the linear dimension of 0.3 mm or more in the connector connecting direction makes it possible for a portion of the optical ferrule sliding on an inner wall of the housing to function as a guide in the sliding direction. Consequently, it is possible to prevent a tip portion, where a connector connecting end face is formed, from deflecting in the foregoing right and left directions relative to the connector connecting direction, and the accommodation position of the optical ferrule in the housing can be stably secured.

The method of molding an optical ferrule of the present invention makes it possible to adopt also a method in which when the concave portion is formed, the concave portion is molded between both corner portions of the foregoing side surface. According to this molding method, when this optical ferrule is accommodated in the housing of, for example, the MPO optical connector, the foregoing two corner portions, which slide on the inner wall of the housing, can function as a guide in a sliding direction. Accordingly, both of the corner portions can function as the long guide in the sliding direction substantially over the whole length of the connector connecting direction on the side surface of the flange portion, which connects between both of the corner portions. Thus, it is possible to more effectively prevent the tip portion, where the connector connecting end face is formed, from deflecting in the right and left directions relative to the connector connecting direction, and the accommodation position of the optical ferrule in the housing can be more stably secured.

Furthermore, the method of molding an optical ferrule of the present invention makes it possible to adopt also a method in which as the shape of the concave portion, the concave portion is formed in a groove shape extending over the whole length of the flange portion along the connector connecting direction by the metal mold. According to this method, since the portion on the external periphery surface of the flange portion other than the concave portion is left over the whole length of the flange portion, that portion can function as a long guide in the connector connecting direction (sliding direction). Therefore, it is possible to prevent a tip portion, in which a connector connecting end face is formed, from deflecting in the right and left directions relative to the connector connecting direction more effectively, and the accommodation position of the optical ferrule accommodated in the housing can be more stably secured.

The method of molding an optical ferrule of the present invention is a method of molding the ferrule body in which the following are formed in the ferrule body: an optical fiber insertion opening portion serving as an insertion port for the optical fiber; an optical fiber insertion hole for inserting and positioning the optical fiber, the optical fiber insertion hole being opened to a connector connecting end face and a guide pin hole for inserting a guide pin thereto for positioning the ferrule body relative to another ferrule body. Partially, this molding method is suitably used in a state where the optical ferrule of the present invention is accommodated in a housing of an optical connector.

BRIEF DESCRIPTION OF THE DRAWINGS

For a more complete understanding of the present invention and the advantages thereof, reference is now made to the following description taken in conjunction with the accompanying drawings.

FIG. 1(a) is a plan view; FIG. 1(b) is a side view; and FIG. 1(c) is a section view taken along the line A—A of FIG. 1(a).

FIG. 6(a) is a plan section view; and FIG. 6(b) is an enlarged view of a portion C of FIG. 6(a).

FIG. 7(a) is a plan section view; and FIG. 7(b) is an enlarged view of a portion D of FIG. 7(a).

FIG. 9(a) is a plan section view; and FIG. 9(b) is an enlarged view of a portion E of FIG. 9(a).

FIG. 10(a) is a plan section view; and FIG. 10(b) is an enlarged view of a portion F of FIG. 10(a.).

FIGS. 13(a) and 13(b) are views showing an operation of a portion G of FIG. 12 in a plug-adapter-plug connection for jointing the MPO optical connectors: FIG. 13(a) is a view showing a state before connectors connecting the end faces of the optical ferrules are joined; and FIG. 13(b) is the view showing a state where thrust force is caused after the joining.

FIG. 17(a) is a plan view; FIG. 17(b) is a side view; and FIG. 17(c) is a section view taken along the line J—J of FIG. 17(a).

DETAILED DESCRIPTIONS OF THE PREFERRED EMBODIMENTS

To describe the present invention in more detail, the present invention will be described according to the attached drawings.

Figure 1A:
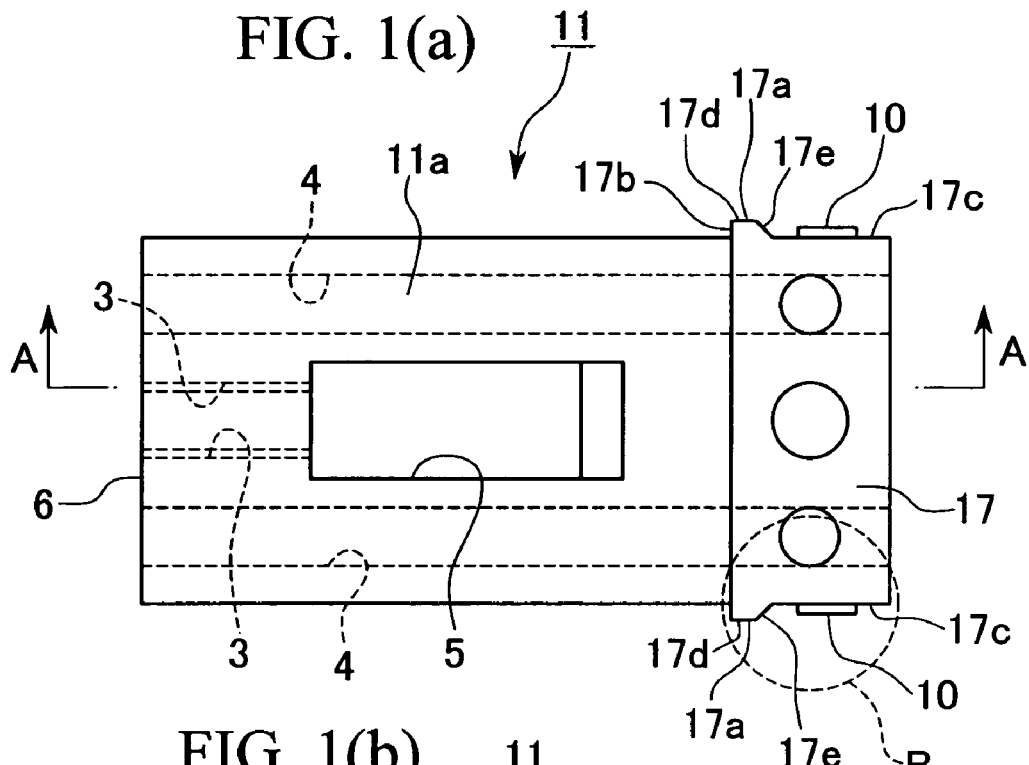
FIGS. 1(a), 1(b) and 1(c) are views showing an embodiment of an optical ferrule of the present invention.
Figure 1B:
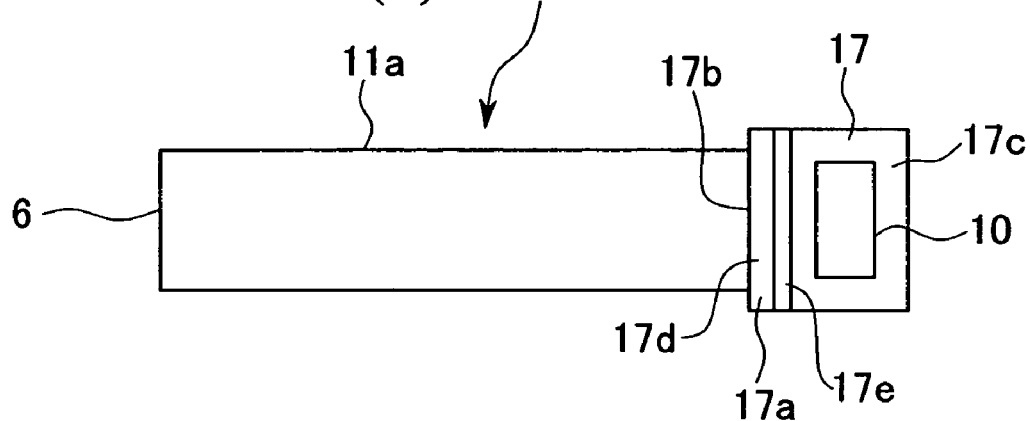
Figure 1C:
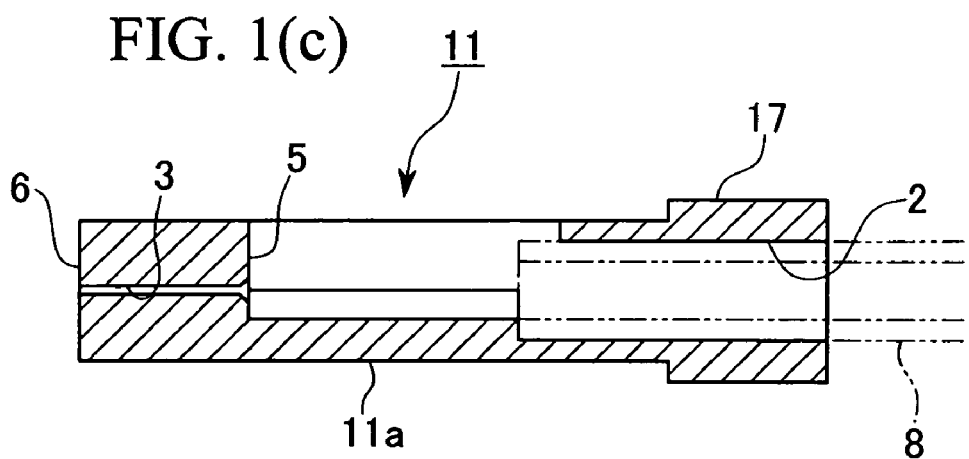
Figure 2:
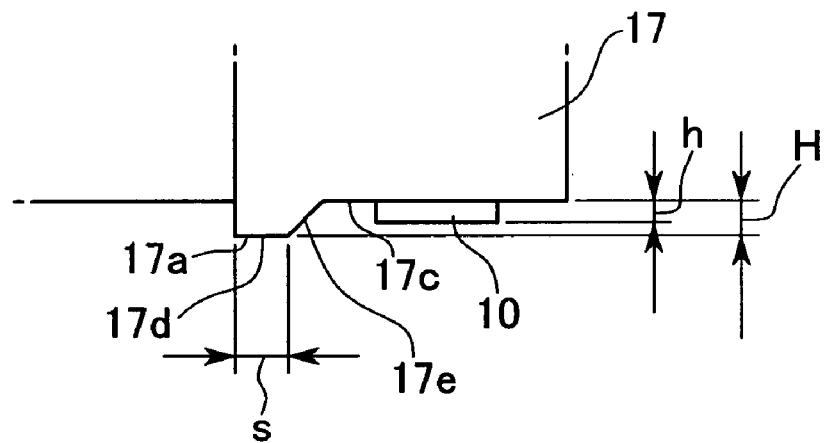
FIG. 2 is an enlarged view of a portion B of FIG. 1(a), showing the optical ferrule of this embodiment.
Figure 3:
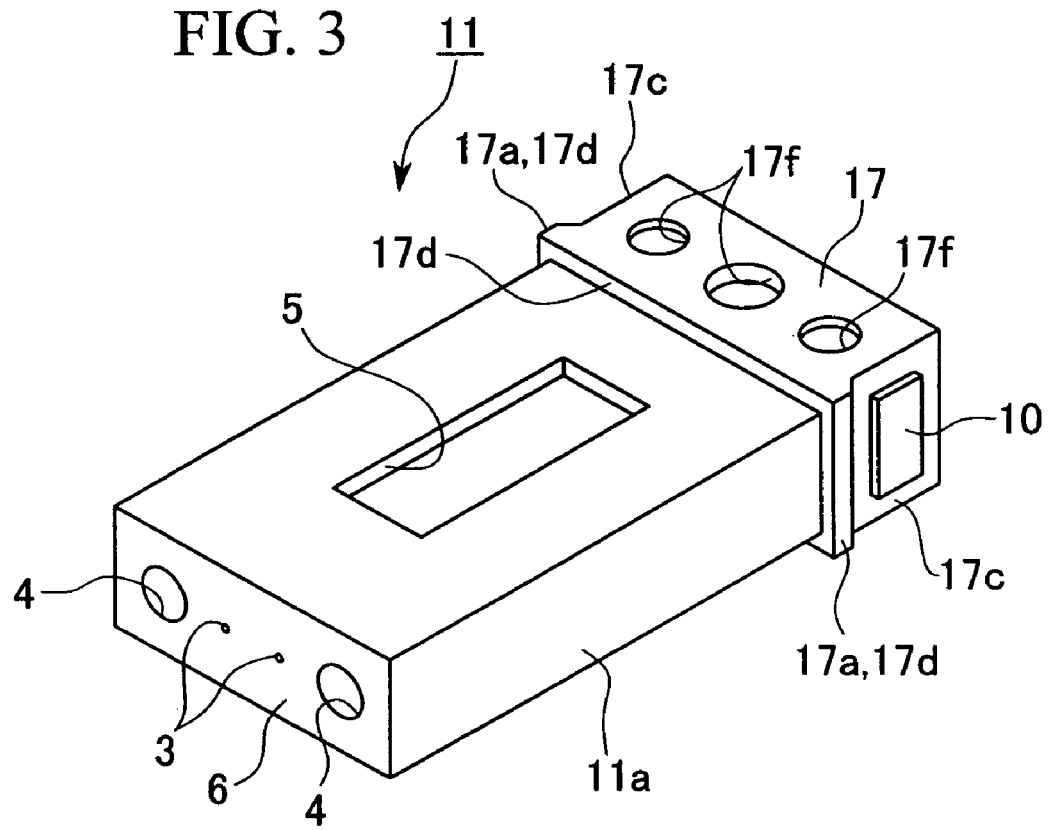
FIG. 3 is a perspective view showing the optical ferrule of this embodiment.

FIGS. 1(a), 1(b) and 1(c) show an embodiment of an optical ferrule (optical connector-use ferrule) of the present invention; FIG. 1(a) is a plan view, FIG. 1(b) is a side view, and FIG. 1(c) is a section view taken along the line A—A of FIG. 1(a). FIG. 2 is an enlarged view of the portion B of the optical ferrule in FIG. 1(a), and FIG. 3 is a perspective view of the optical ferrule of this embodiment. In these drawings, the same reference numerals are given to the same constituent components as those in the conventional ferrule 1 for use in an optical connector described in the prior arts.

As shown in these drawings, this optical ferrule 11 (hereinafter referred to as a ferrule body 11) is a part made of plastic, to which a tip of an optical fiber (not shown) is internally fixed so as to be connected to a connector. Within the ferrule body 11, there are formed: an optical fiber insertion opening portion 2 serving as an insertion port of the optical fiber; a pair of optical fiber insertion holes 3 opened in a connector connecting end faces 6, the optical fiber insertion holes 3 inserting and positioning the optical fiber; a pair of guide pin holes 4 for inserting guide pins (not shown) thereto for use in positioning the ferrule body 11 relative to another ferrule body are inserted; and an adhesive pouring window 5. The external shape of the ferrule body 11 takes a rectangular shape, and has a structure with a flange portion 17 formed in a rear end portion (the right part of FIG. 1) opposite to a tip end portion of the ferrule body 11 where the connector connecting end face 6 is formed so as to protrude toward the outside from an external peripheral surface 11a of the ferrule body 11. For example, the ferrule body 11 is molded by use of transfer molding using epoxy resin such as heat-hardening resin, injection molding using thermoplastic resin such as PPS (polyphenylene sulfide) and LCP (liquid crystal polymer) and other moldings.

An optical fiber (a single mode or multi mode type naked fiber) from which its cover is detached is inserted in each of the optical fiber insertion holes 3, and is fixed thereto with adhesive. Reference numeral 8 shown in FIG. 1(c) denotes a rubber boot for protecting the inserted optical fiber. This rubber boot 8 is used if necessary.

In the ferrule 11 of this embodiment, a concave portion 17c is formed at a position in an external periphery surface of the flange portion 17, where a gate is located in resin molding. Furthermore, in this embodiment, the flange portion 17 takes a rectangular shape when viewed from the rear end portion toward the connector connecting end face 6, that is, the flange portion 17 takes a rectangular shape in which the two sides parallel to its width direction, i.e., the vertical direction in FIG. 1(a) are longer than the two sides parallel to its thickness direction, i.e., the vertical direction in FIG. 1(b). Concave portions 17c are formed in both of the right and left side surfaces 17a of the external periphery surface of the flange portion 17, which are perpendicular to the foregoing width direction of the flange portion 17. However, the formation positions of the concave portions 17c are not limited to this, and a constitution may be adopted in which the concave portion 17c is formed in any one of the upper and lower surfaces of the external periphery surface of the flange portion 17, which are parallel to the foregoing width direction, or formed in both of them. Furthermore, another constitution may be adopted in which the concave portion 17c is formed only in any one of the right and left side surfaces 17a of the external periphery surface of the flange portion 17.

The gate must be located at a suitable position in the ferrule body in consideration of flow (orientation) of the resin in a metal mold. Specifically, some residual stress occurs in the resin during its cure shrinkage, and strain becomes large when the optical ferrule is not designed so as to obtain an optimum position of the gate. As a result, there is the concern that warping and cracking may occur. The provision of the gates in both sides of the flange portion 17 as in the present invention is selected from the viewpoint of the above circumstances. Particularly, when injection molding is performed for a thermoplastic resin, shrinkage strain near the gate is large, and hence there is an advantage that the position where the gate is formed can be set apart from the connection end of the ferrule body 11. Furthermore, the provision of the gates in the two positions which are symmetrical with respect to the horizontal direction is effective for decreasing occurrence of stain.

Furthermore, in this embodiment, when the respective concave portions 17c are formed in the right and left side surfaces 17a of the flange portion 17, the respective concave portions 17c are formed so as to remove also the rear end corner portions of the side surfaces 17a in the connector connecting direction, and when a linear dimension s (see FIG. 2) of the portion 17d obtained by removing the concave portion 17c from the side surface 17a in the connector connecting direction is set to, for example, 0.3 mm or more, that is, when the portion 17d (hereinafter referred to as a portion 17d) which is adjacent to the shoulder portion 17b of the flange portion 17 in the ferrule body 11 and requires an intrinsic width dimension to function as the flange portion 17 is set to 0.3 mm, or more it is possible to use the ferrule body 11 without any particular problems when the ferrule body 11 is built in, for example, an MPO optical connector. Specifically, if the foregoing linear dimension is equal to 0.3 mm or less, when the ferrule body 11 is accommodated in the housing of the MPO optical connector or the like, the portion 17d sliding on an inner wall of the housing cannot function as a guide in a sliding direction, and a tip portion, where a connector connecting end face 6 is formed, deflects in the right and left directions relative to the connector connecting direction. As a result, there is the concern that the accommodation position of the ferrule body 11 in the housing cannot be stably secured. For such reasons, without some flatness in the portion 17d, it may be impossible for the ferrule body 11 to move in the housing smoothly, so that the foregoing linear dimension s should be reserved to be 0.3 mm or more. Furthermore, it is preferable that the position of the concave portion 17c provided in the flange portion 17 not be contiguous with the shoulder portion 17b, but close to the rear end of the ferrule body 11, that is, the rear end surface of the ferrule body 11 on the right side of FIGS. 1(a) to (c) and 2. The reason is that since the foregoing linear dimension s must be long to accommodate the ferrule body 11 in the housing correctly, the concave portion 17c of the flange portion 17 should be provided at a position which is not in adjacent to the shoulder portion 17b.

The foregoing shoulder portion 17b of the flange portion 17 is a front wall portion thrusting on an inner wall of the housing when the ferrule body 11 is fitted in the housing, and in a state where the ferrule body 11 is pushed forward in the connector connecting direction by a spring in the housing, the ferrule body 11 thrusts on the inner wall of the housing through the shoulder portion 17b to be positioned in the housing. This appearance described above will be described later in detail with reference to the drawing.

The foregoing right and left side surfaces 17a take a step shape which extends from the portion 17d to the concave portion 17c through a slope surface 17e. Moreover, in the foregoing upper surface of the flange portion 17, circular-shaped concave portions 17f are formed in three points as shown in FIG. 3. When the foregoing optical fibers are connected and fixed to the ferrule body 11, these concave portions 17f are ones on which paint is coated to indicate a relative direction, line numbers and the like between the optical fibers.

Although illustrations are omitted, the formation points of the concave portions 17c, their number, and shape may be related to factors such as the material of the ferrule body 11, the sort of the optical fiber built therein and the number of core wires of the optical fiber. As the formation point of the concave portion in this case, the concave portion is as well formed in the flange portion 17 of the ferrule body 11, and a gate in resin molding should be disposed in this concave portion. According to this constitution, by confirming the formation points of the concave portions, the number of the concave portions and the shape of the concave portions, it is possible to obtain a decision method which is capable of easily confirming confirmation factors such as a material of the ferrule body 11, and a sort of the optical fiber built therein.

Figure 4:
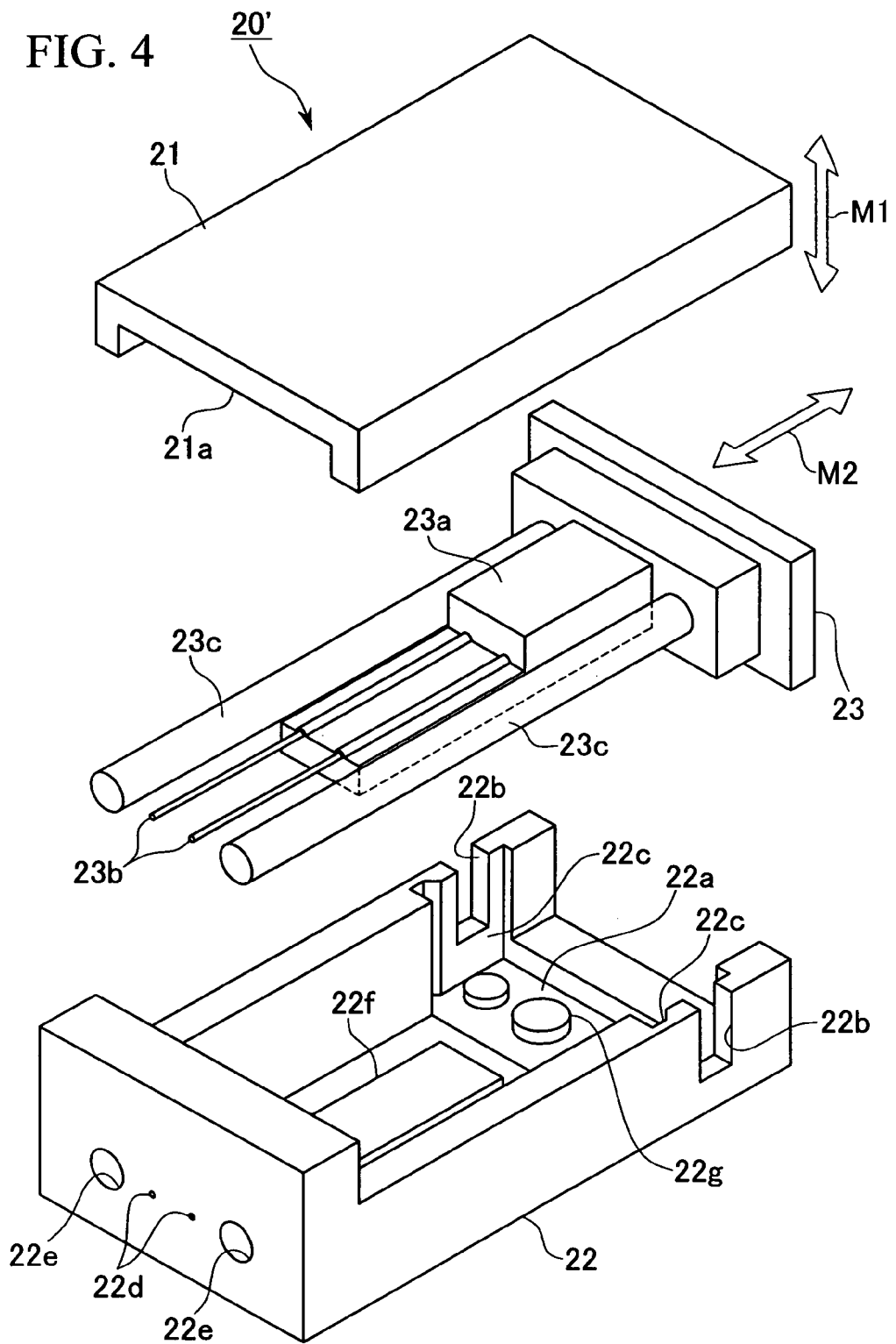
FIG. 4 is an exploded perspective view showing an example of a metal mold for molding the optical ferrule of this embodiment.

When the ferrule body 11 (optical ferrule) having the above-described constitution is molded with a metal mold, the ferrule body 11 should be molded by use of a metal mold 20' in which gates 22b are positioned at positions corresponding to the respective concave portions 17c of the flange portion 17, for example, as shown in FIG. 4. This metal mold 20' comprises an upper mold 21, a lower mold 22 and a middle mold 23 sandwiched between the upper and lower molds 21 and 22.

In the illustrated example, the lower mold 22 is disposed fixedly, and it is possible to superpose the upper mold 21 on the lower mold 22 by relative movement of the upper mold 21 upward and downward along the direction of the arrow M1. The middle mold 23 can slide to the direction of the arrow M2 which is the horizontal direction, in a position at an elevation where the middle mold 23 can be fitted in the lower mold 22. The middle mold 23 is a metal mold part constituted by uniting a portion 23a forming the optical fiber insertion opening portion 2 of the ferrule body 11, a pair of pins 23b forming the optical fiber insertion hole 3 and a pair of pins 23c forming the guide pin hole 4. In the upper mold 21 and the lower mold 22, a concave portion 21a and a concave portion 22a which form a cavity for the middle mold 23 are formed, respectively. Note that when a molded article molded by the metal mold 20' of FIG. 4 is inverted, the situation shown in FIG. 3 is obtained.

In this embodiment, the gate 22b is formed in each side wall of the lower mold 22, and the gate 22b is formed at a position (a portion 22c forming the side surface of the flange portion 17) corresponding to each of the right and left side surfaces 17a of the flange portion 17 in the ferrule body 11. In the concave portion 22a of the lower mold 22, a protrusion portion 22f for forming the foregoing adhesive pouring window 5, and a protrusion portion 22g for forming each of the foregoing concave portions 17f are formed. Furthermore, in the lower mold 22, formed are: a pair of holes 22d each allowing a tip portion of corresponding one of the pins 23b of the middle mold 23 to be inserted thereinto and supporting the one inserted thereinto; and a pair of holes 22e, each allowing a tip portion of corresponding one of the pins 23c of the middle mold 23 to be inserted thereinto and supporting the one inserted thereinto.

In the metal mold 20', though each gate 22b is provided in the lower mold 22, the gate 22b may be provided in the upper mold 21, or the gate 22b may be provided so as to bestride both of the lower and upper molds 22 and 21.

Furthermore, though the metal mold 20' is described as a single-cavity mold in FIG. 4, a multi-cavity mold is usually used.

When the foregoing ferrule body 11 (optical ferrule) is molded by use of the metal mold 20' described above, the middle mold 23 is slid to move toward the lower mold 22 in the direction of the arrow M2, and then fixed to the lower mold 22 by assembly. Furthermore, the upper mold 21 is moved in the direction of the arrow M1 so as to be superposed thereon, and then fixed. Thereafter, molten resin is injected from the gate 22b. After the molten resin is cured, the upper mold 21 is elevated in the direction of the arrow M1, and the metal mold 20' is opened. The middle mold 23 backs away in the direction of the arrow M2, and the molded article is taken out. In the molded article at this time, by the metal mold 20', the foregoing connector connecting surface 6, the concave portions 17c disposed in the external periphery surface of the flange portion 17 so as to correspond to the respective gates 22b, the portions 17d, the optical fiber insertion opening portion 2, the optical fiber insertion holes 3, the guide pin holes 4, the adhesive injection window 5, the concave portions 17f and the like are formed.

Subsequently, when the gate of the molded article taken out is cut with a gate cutter, the flash 10 as shown in FIG. 1(a) to FIG. 3 remains. In this case, it is easy to cut the gate so that the height of the flash 10 (see FIG. 2) remaining after the cutting of the gate with the gate cutter can be lower than the depth H of the concave portion 17c, which is, for example, 0.25 mm, and the cutting of the gate is possible so that the flash 10 can not protrude from the portion 17d.

Moreover, the ferrule body 11 undergoes a sandblast treatment, and its parting lines are removed (this sandblast treatment can readily make the surface of the ferrule body 11 smooth, and the sandblast treatment does not affect the sliding of the ferrule body 11 within the housing). Thereafter, the ferrule body 11 requires only washing before use. Accordingly, since it is unnecessary to polish the side surface 17a of the flange portion 17 as has been conventionally done, a large number of ferrule bodies 11 (optical ferrules) can be automatically manufactured without requiring much manpower.

Figure 5:
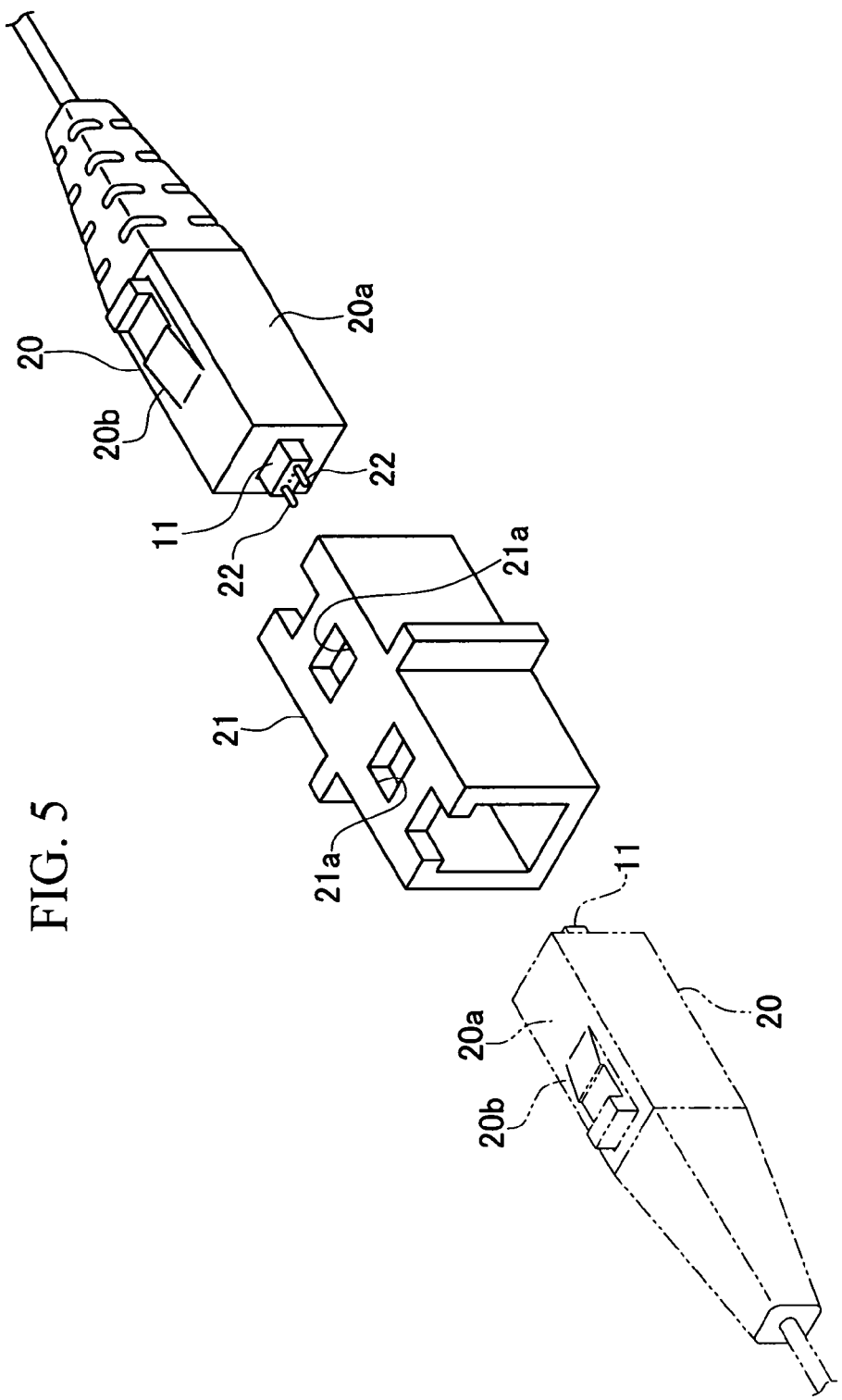
FIG. 5 is a perspective view showing a state before a plug-adapter-plug connection for connecting RJ optical connectors accommodating the optical ferrule of this embodiment to each other so as to interpose an adapter therebetween.

FIG. 5 is a perspective view showing a plug-adapter-plug connection, in which the RJ optical connector 20, which accommodates the ferrule body 11 of this embodiment obtained by the molding method described above in the housing 20a, is connected to the other ferrule body 11 so as to interpose the adapter 21 therebetween. Note that, as shown in the drawing, the guide pin 22 is inserted into each of the guide pin holes 4 of the ferrule body 11 only in one of the pair of RJ optical connectors 20. The guide pin 22 is not inserted in the other ferrule body 11 (illustrated by chain double-dashed lines), and when both ferrule bodies 11 are connected to each other by thrusting them against each other, the guide pin 22 of one ferrule body 11 is inserted in the guide pin hole 4 of the other ferrule body 11, and a relative positioning of the both ferrule bodies 11 can be performed. Furthermore, a pair of through holes 21a are formed in a wall surface of the adapter 21 in its longitudinal direction, and engaging protrusion portions 20b formed in wall surfaces of the housings 20a engage with the respective through holes 21a, whereby the housings 20 and the adapter 21 are fixedly connected.

Figure 6A:
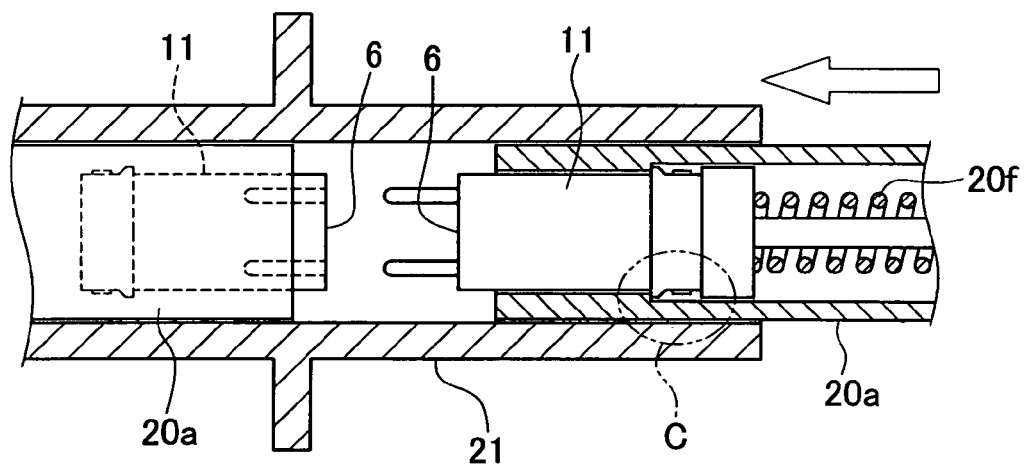
FIGS. 6(a) and 6(b) show a state before connectors connecting the end faces of the optical ferrules are joined to each other in the plug-adapter-plug connection.
Figure 6B:
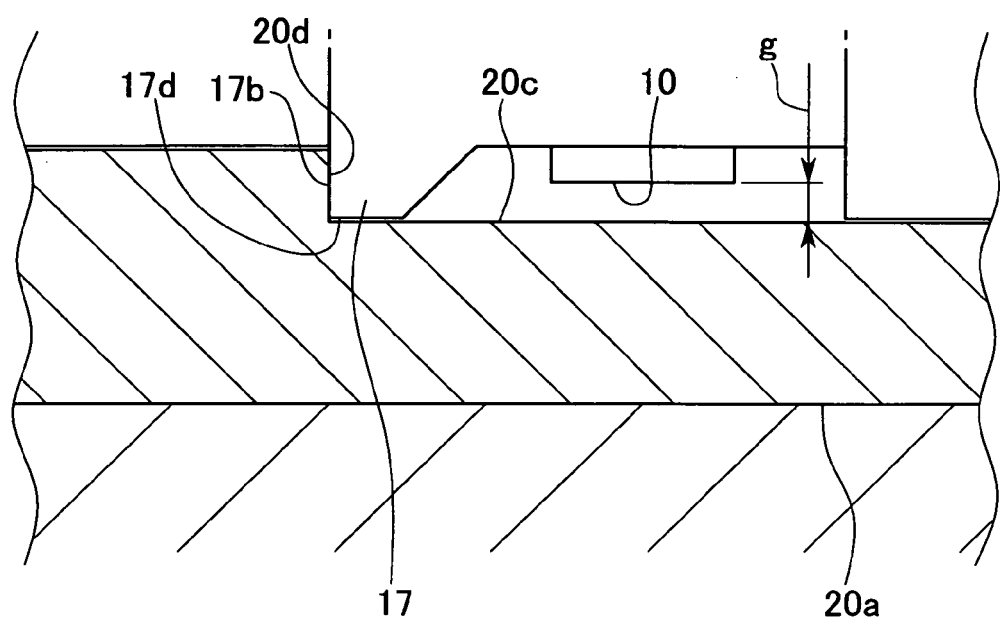

FIGS. 6(a) and 6(b) are views showing a state before the connector connecting end faces 6 of the ferrule bodies 11 are joined to each other in the plug-adapter-plug connection. FIG. 6(a) is a plan section view, and FIG. 6(b) is an enlarged view of the portion C of FIG. 6(a). In FIG. 6(a), reference numeral 20f denotes a spring for urging the ferrule body 11 in a direction where the tip portion of the ferrule body 11 protrudes from the housing 20a. As shown in FIG. 6(b), the urging force exerted by the spring 20f is stopped in such a manner that a step difference 20d formed in the inner wall 20c of the housing 20a contacts firmly the shoulder portion 17b of the flange portion 17 of the ferrule body 11. Accordingly, the tip portions of the ferrule bodies 11 in this state are held in a state where the tip portions thereof protrude from the tips of the respective housings 20a. However, since the foregoing flash 10 remaining in the ferrule body 11 is cut so as not to protrude from the portion 17d as described above, a gap having a dimension g is formed for the inner wall surface 20c of the housing 20a, and the flash 10 is made not to contact the inner wall 20c of the housing 20a. Accordingly, in the right and left side surfaces 17a of the flange portion 17 of the ferrule body 11, only the portion 17d contacts the inner wall 20c of the housing 20a.

Figure 7A:
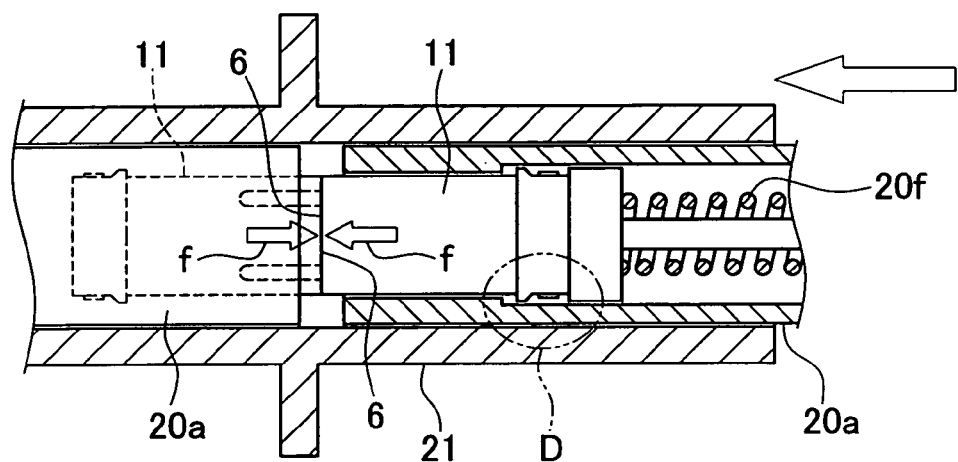
FIGS. 7(a) and 7(b) are views showing a state where thrust force is caused by joining the connector connecting the end faces of the optical ferrules in the plug-adapter-plug connection.
Figure 7B:
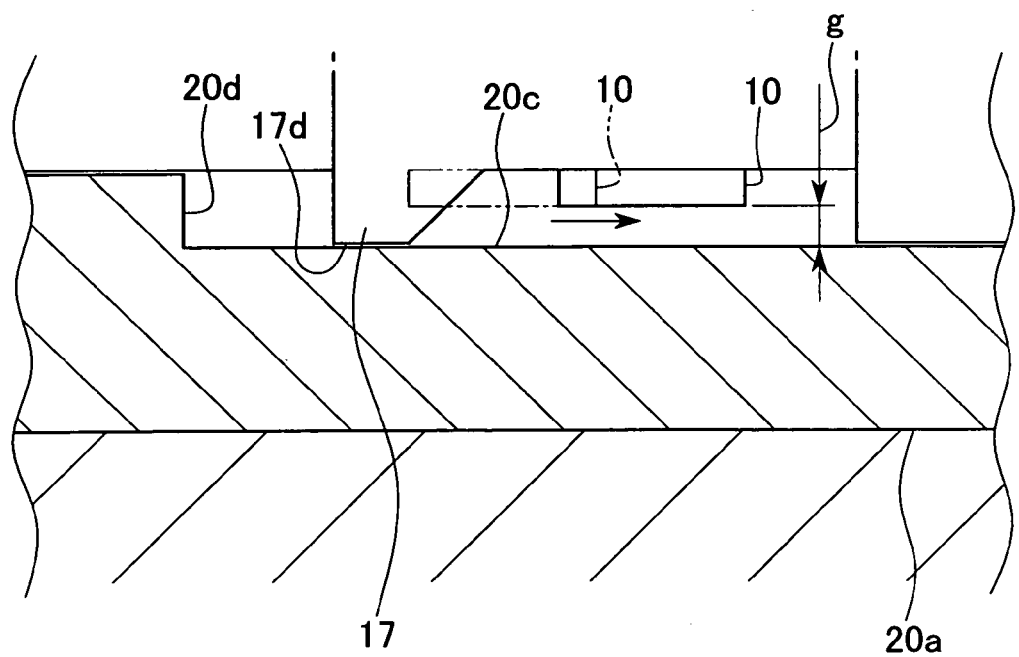

FIGS. 7(a) and 7(b) are views showing a state where the connector connecting end faces 6 of the ferrule bodies 11 are jointed to each other and a thrust force occurs in the plug-adapter-plug connection. FIG. 7(a) is a plan section view, and FIG. 7(b) is an enlarged view of the portion D of FIG. 7(a). In the state where the ferrule bodies 11 are thrust against each other as shown in FIG. 7(a), the shoulder portion 17b of the flange portion 17 of the ferrule body 11 backs away from the foregoing step difference 20d of the housing 20a, the urging force exerted by the foregoing spring 20f is used as thrust force f between the connector connecting end faces 6. As described above, in the course of inserting the RJ connector 20 in the adapter 21 deeply, each of the ferrule bodies 11 moves so as to retreat into the housing 20a in a state where the thrust force f between the connector end faces 6 is kept. Only the portion 17d of the flange portion 17 at this time contacts and slides on the inner wall 20c of the housing 20a as shown in FIG. 7(b). Since the flash 10 still keeps the gap having the foregoing dimension g for the inner wall 20c of the housing 20a and does not contact the inner wall 20c of the housing 20a, the flash 10 never hinders the ferrule body 11 from sliding on the inner wall 20c of the housing 20a. Accordingly, even if the labor for removing the flash 10 by polishing is eliminated, no problem occurs, so that it is possible to improve productivity of the ferrule body 11 by eliminating the polishing. Specifically, it is possible to automatically manufacture a large number of optical ferrules without much manpower.

Figure 8:
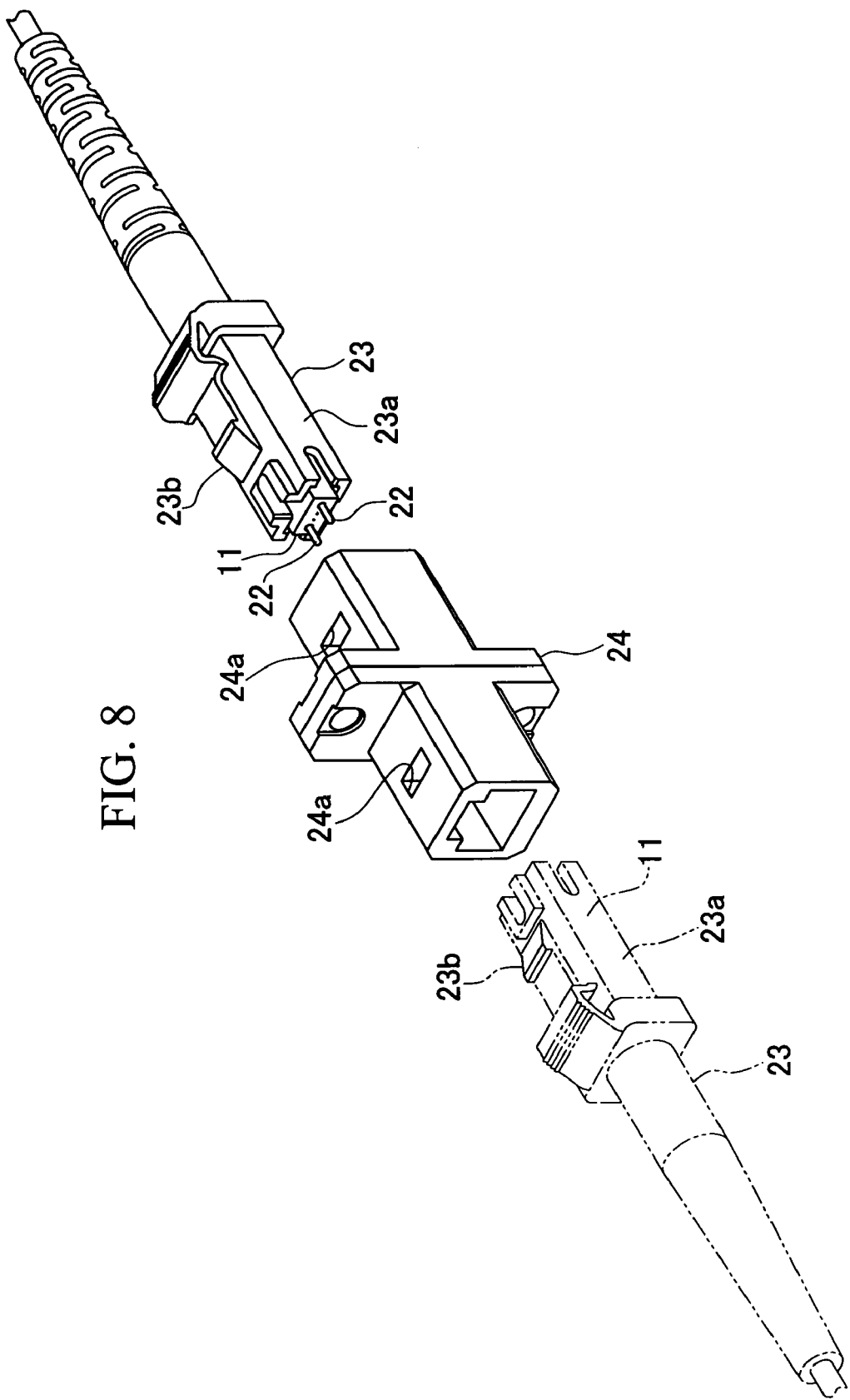
FIG. 8 is a perspective view showing a plug-adapter-plug connection for connecting other RJ optical connectors accommodating the optical ferrule of this embodiment to each other so as to interpose an adapter therebetween.

FIG. 8 is a perspective view showing a plug-adapter-plug connection, in which another type of RJ optical connectors 23 accommodating the foregoing ferrule bodies 11 are connected so as to interpose an adapter 24 therebetween. Note that, as shown in FIG. 8, the guide pin 22 is inserted into each of the guide pin holes 4 of the ferrule body 11 only in one of the pair of RJ optical connectors 23. The guide pin 22 is not inserted into each of the guide pin holes 4 in the other ferrule body 11 (illustrated by chain double-dashed lines), and when the both ferrule bodies 11 are connected to each other by thrusting them against each other, the guide pin 22 of one ferrule body 11 is inserted in the guide pin hole 4 of the other ferrule body 11, and a relative positioning of the both ferrule bodies 11 can be performed. Furthermore, a pair of through holes 24a are formed in wall surfaces of the adapter 24 in its longitudinal direction, and engaging protrusion portions 23b formed in wall surfaces of the housings 23a engage with each other, whereby the housings 23a and the adapter 24 are fixedly connected.

Figure 9A:
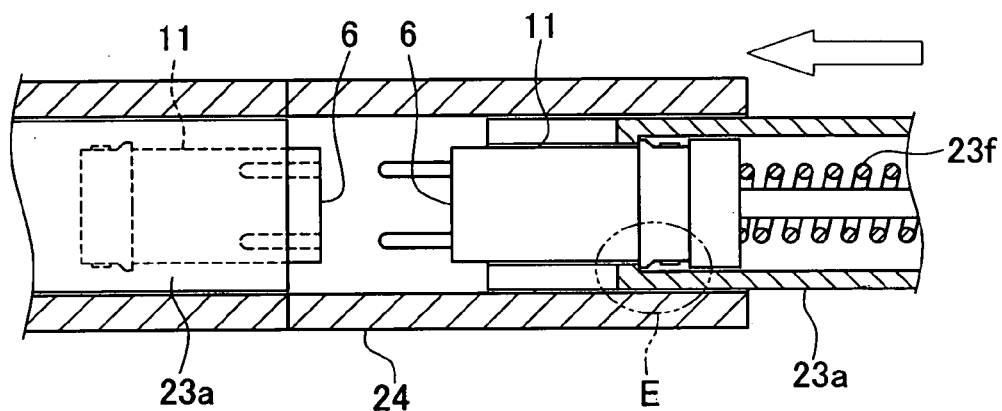
FIGS. 9(a) and 9(b) show a state before connectors connecting the end faces of the optical ferrules are jointed to each other in the plug-adapter-plug connection.
Figure 9B:
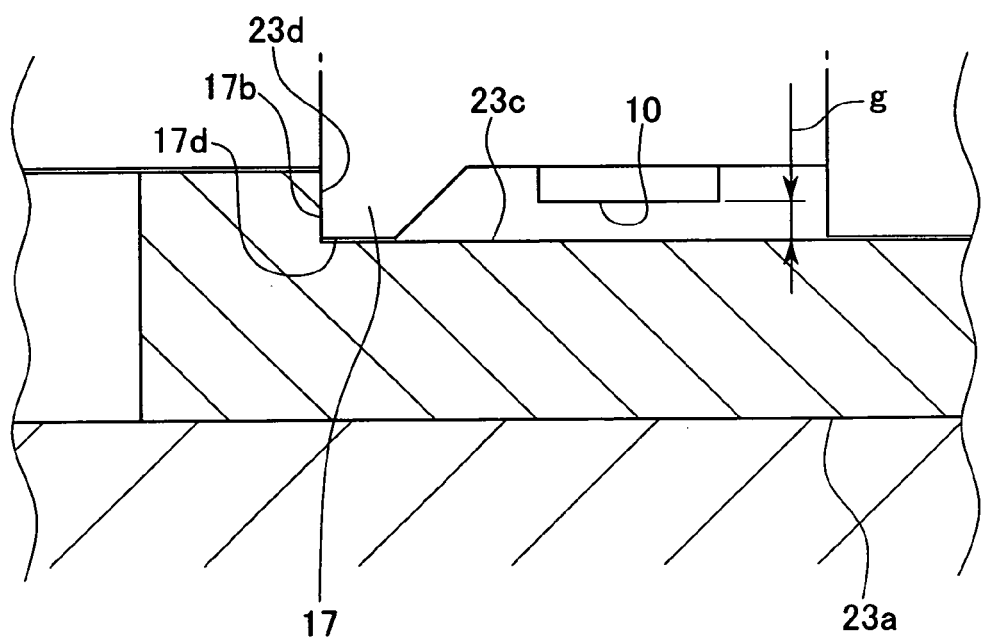

FIGS. 9(a) and 9(b) are views showing the state before the connectors connecting the end faces 6 of the ferrule bodies 11 are joined to each other in the plug-adapter-plug connection. FIG. 9(a) is a plan section view, and FIG. 9(b) is an enlarged view of the portion E of FIG. 9(a). In FIG. 9(a), reference numeral 23f denotes a spring for urging the ferrule body 11 in a direction where the tip portion of the ferrule body 11 protrudes from the housing 23a. As shown in FIG. 9(b), in the state before the connectors connecting the end faces 6 are joined to each other, shown in FIG. 9(a), the urging force exerted by the spring 23f is stopped in such a manner that a step difference 23d formed in the inner wall 23c of the housing 23a contacts firmly the shoulder portion 17b of the flange portion 17 of the ferrule body 11. Accordingly, the tip portions of the ferrule bodies 11 in this state are held in a state where the tip portions thereof protrude from the tips of the respective housings 23a. However, since the foregoing flash 10 remaining in the ferrule body 11 is cut so as not to protrude from the portion 17d as described above, a gap having a dimension g is formed for the inner wall 23c of the housing 23a, and the flash 10 is made not to contact the inner wall 23c of the housing 23a. Accordingly, in the right and left side surfaces 17a of the flange portion 17 of the ferrule body 11, only the portion 17d contacts the inner wall 23c of the housing 23a.

Figure 10A:
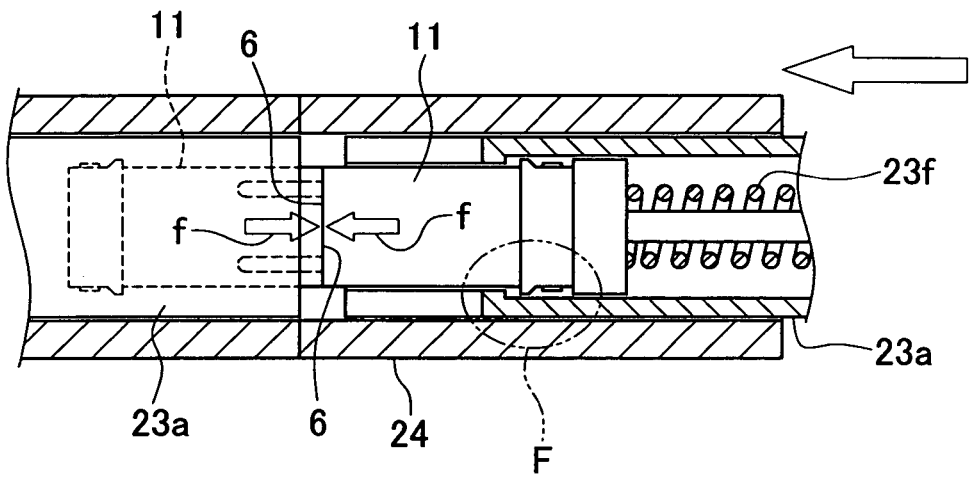
FIGS. 10(a) and 10(b) show a state where thrust force is caused by joining the connector connecting end faces of the optical ferrules in the plug-adapter-plug connection.
Figure 10B:
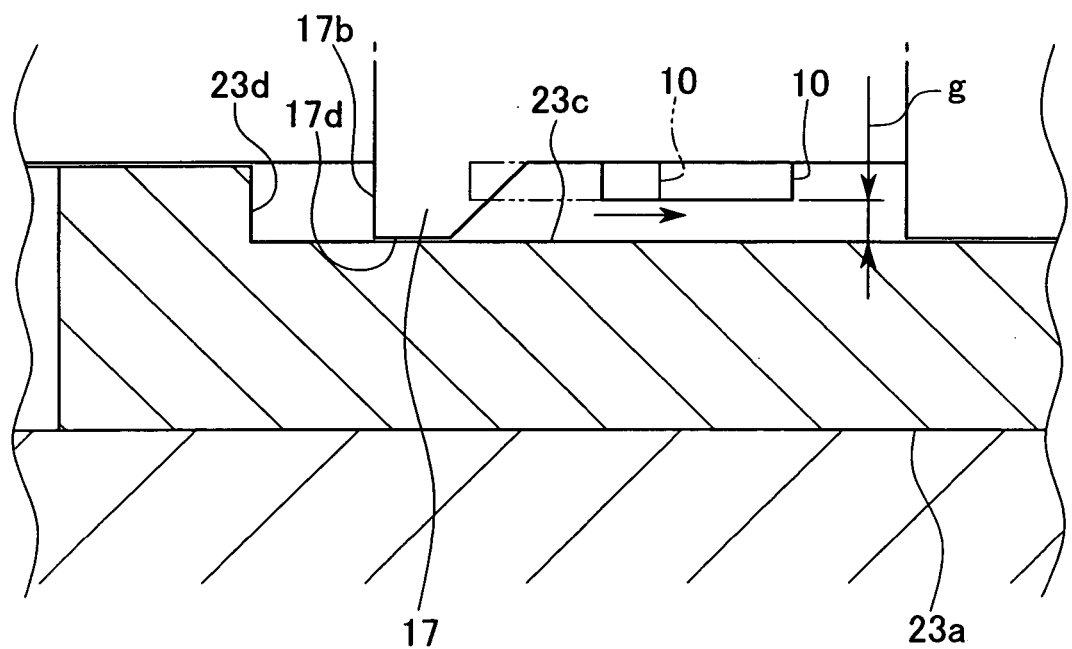

FIGS. 10(a) and 10(b) are views showing a state where the connector connecting end faces 6 of the ferrule bodies 11 are jointed to each other, and a thrust force occurs. FIG. 10(a) is a plan section view, and FIG. 10(b) is an enlarged view of the portion F of FIG. 10(a). In the state where the ferrule bodies 11 are thrust against each other as shown in FIG. 10(a), the shoulder portion 17b of the flange portion 17 of the ferrule body 11 backs away from the foregoing step difference 23d of the housing 23a, the urging force exerted by the foregoing spring 23f is used as thrust force f between the connector connecting end faces 6. As described above, in the course of inserting the RJ connector 23 in the adapter 24 deeply, each of the ferrule body 11 moves so as to retreat into the housing 23a in a state where the thrust force f between the connector end faces 6 is kept. Only the portion 17d of the flange portion 17 at this time contacts and slides on the inner wall 23c of the housing 23a as shown in FIG. 10(b). Since the flash 10 still keeps the gap having the foregoing dimension g for the inner wall 23c of the housing 23a and does not contact the inner wall 23c of the housing 23s, the flash 10 never hinders the ferrule body 11 from sliding on the inner wall 23c of the housing 23c. Accordingly, even if the labor for removing the flash 10 by polishing is eliminated, no problem occurs, so that it is possible to improve productivity of the ferrule body 11 by eliminating the polishing. Specifically, it is possible to automatically manufacture a large number of optical ferrules without much manpower.

Figure 11:
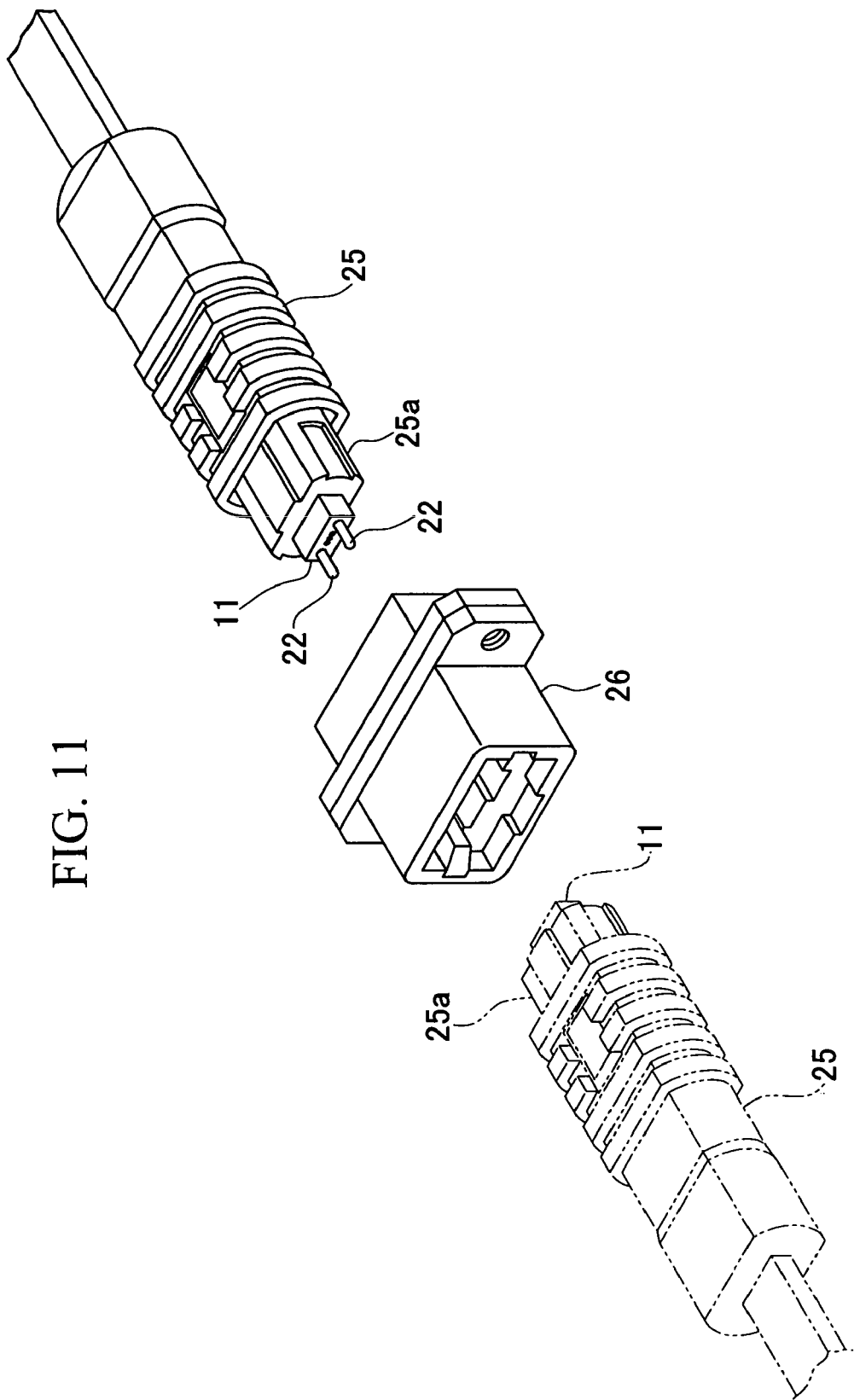
FIG. 11 is a perspective view showing a plug-adapter-plug connection for connecting MPO optical connectors accommodating the optical ferrules of this embodiment to each other so as to interpose an adapter therebetween.

FIG. 11 is a perspective view showing a plug-adapter-plug connection, in which MPO optical connectors 25 accommodating the foregoing ferrule bodies 11 are connected so as to interpose an adapter 26 therebetween. Note that, as shown in FIG. 11, the guide pin 22 is inserted into each of the guide pin holes 4 of the ferrule body 11 only in one of the pair of MPO optical connectors 25. The guide pin 22 is not inserted in the other ferrule body 11 (illustrated by chain double-dashed lines), and when the two ferrule bodies 11 are connected to each other by thrusting them against each other, the guide pin 22 of one ferrule body 11 is inserted in the guide pin hole 4 of the other ferrule body 11, and relative positioning of the two ferrule bodies 11 can be performed.

Figure 12:
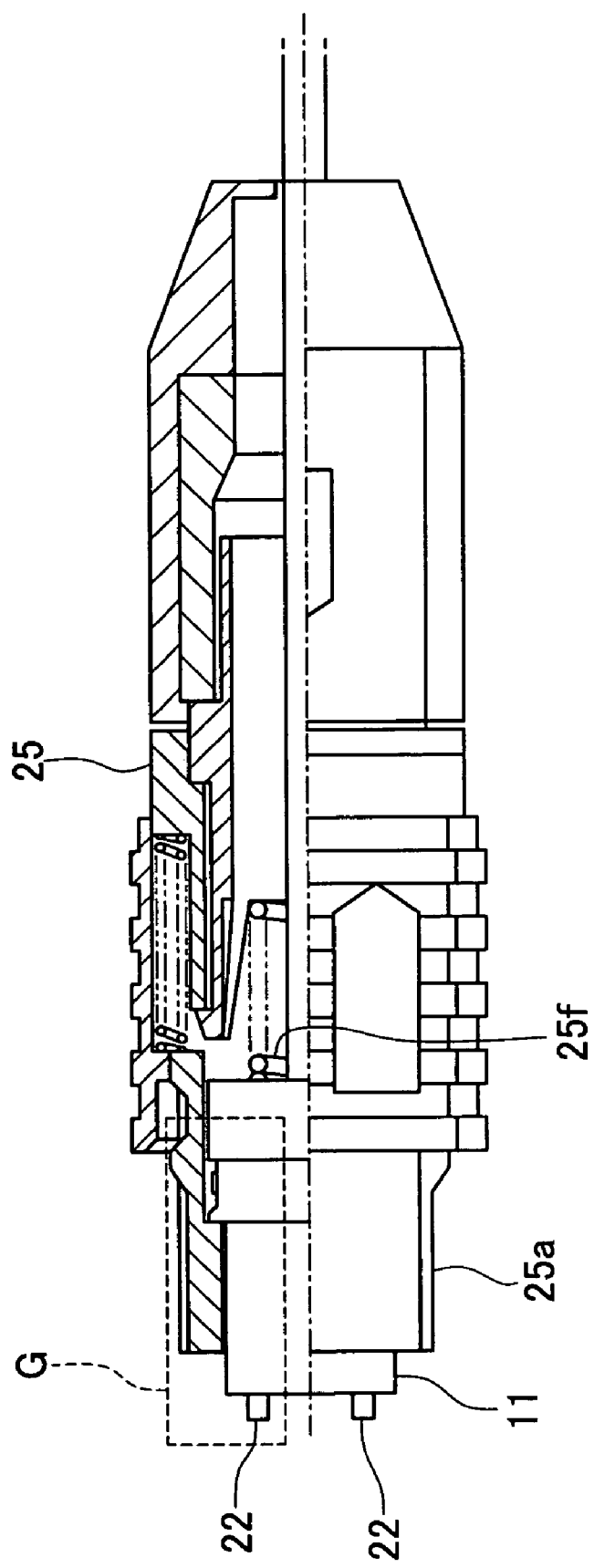
FIG. 12 is a plan section view showing a structure of the inside of the MPO optical connector.

FIG. 12 is a plan section view showing an internal structure of the MPO optical connector 25 accommodating the foregoing ferrule body 11. FIGS. 13(a) and 13(b) are views showing an operation of the portion G of FIG. 12 in the plug-adapter-plug connection of the MPO optical connectors 25. FIG. 13(a) is a view showing the state before the connectors connecting the end faces 6 of the ferrule bodies 11 are joined to each other, and FIG. 13(b) is a view showing a state where thrust force is caused after joining.

In FIG. 12, reference numeral 25f denotes a spring for urging the ferrule body 11 in a direction where the tip portion of the ferrule body 11 protrudes from the housing 25a. In the state before jointing shown in FIG. 13(a), urging force exerted by the spring 25f is stopped in such a manner that a step difference 25d formed in the inner wall 25c of the housing 25a contacts firmly the shoulder portion 17b of the flange portion 17 of the ferrule body 11. Accordingly, the tip portions of the ferrule bodies 11 in this state are held in a state where the tip portions thereof protrude from the tips of the respective housings 25a. However, since the foregoing flash 10 remaining in the ferrule body 11 is cut so as not to protrude from the portion 17d as described above, a gap having a dimension g is formed for the inner wall 25c of the housing 25a, and the flash 10 is made not to contact the inner wall 25c of the housing 25a. Accordingly, in the right and left side surfaces 17a of the flange portion 17 of the ferrule body 11, only the portion 17d contacts the inner wall 25c of the housing 25a.

In the state where the ferrule bodies 11 are thrust against each other as shown in FIG. 13(b), the shoulder portion 17b of the flange portion 17 of the ferrule body 11 backs away from the foregoing step difference 25d of the housing 25a, the urging force exerted by the foregoing spring 25f is used as thrust force f between the connector connecting end faces 6. As described above, in the course of inserting the MPO connector 25 in the adapter 26 deeply, each of the ferrule body 11 moves so as to retreat into the housing 25a in a state where the thrust force f between the connector end faces 6 is kept. Only the portion 17d of the flange portion 17 at this time contacts and slides on the inner wall 25c of the housing 25a as shown in FIG. 13(b). Since the flash 10 still keeps the gap having the foregoing dimension g for the inner wall 25c of the housing 25a and does not contact the inner wall 25c of the housing 25a, the flash 10 never hinders the ferrule body 11 from sliding on the inner wall 25c of the housing 25a in the housing 25a. Accordingly, even if the labor for removing the flash 10 by polishing is eliminated, no problem occurs, so that it is possible to improve productivity of the ferrule body 11 by eliminating the polishing. Specifically, it is possible to automatically manufacture a large number of optical ferrules without much manpower.

Modifications of the foregoing ferrule body 11 are shown in FIGS. 14(a) to 14(h). FIGS. 14(a) to 14(h) are partially enlarged plan views of the flange portion 17 corresponding to the portion B of FIG. 1. Each arrow shows the gate position.

The flange portion 17 of FIGS. 14(a) to 14(d) has a structure wherein a portion opposite to the foregoing shoulder portion 17b (each of the right parts of FIGS. 14(a) to 14(d)) is cut off so as to form a concave portion 17c taking a step shape. The concave portion 17c of FIG. 14(a) takes a step shape which runs thereinto from the portion 17d via a step difference wall surface 17h perpendicular to the portion 17d. The concave portion 17c of FIG. 14(b) takes the step shape which runs thereinto from the portion 17d via one concave-shaped arc wall surface 17i. The concave portion 17c of FIG. 14(c) takes a shape which runs thereinto from the part 17d via one convex-shaped arc wall surface 17j. The concave portion 17c of FIG. 14(d) takes a shape which runs thereinto from the part 17d via a convex-shaped arc wall surface 17k and a concave-shaped arc wall surface 17l.

Figure 14A:
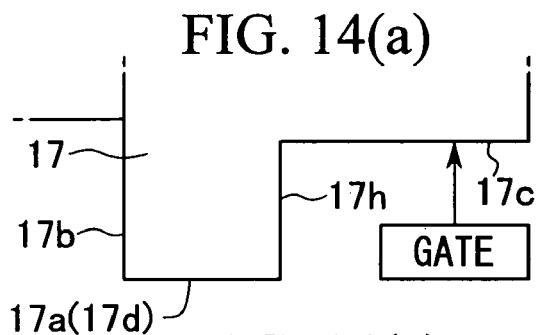
FIGS. 14(a) to 14(h) are partially enlarged plan views of a flange portion corresponding to the portion B of FIG. 1 showing various modifications of a concave portion in the optical ferrule of the present invention.
Figure 14B:
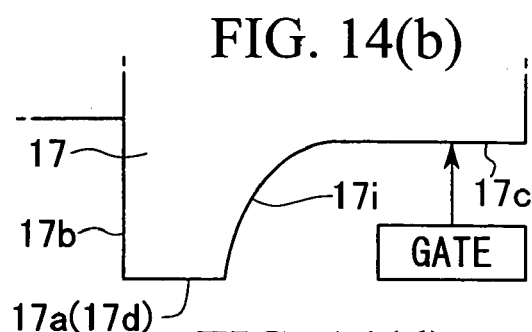
Figure 14C:
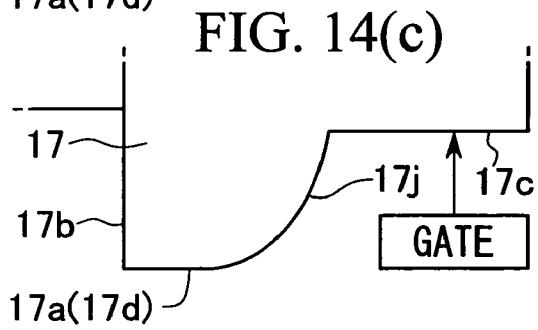
Figure 14D:
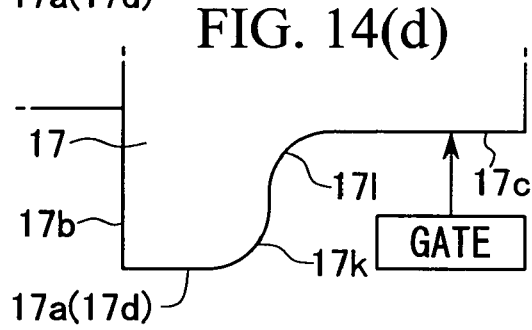
Figure 14E:
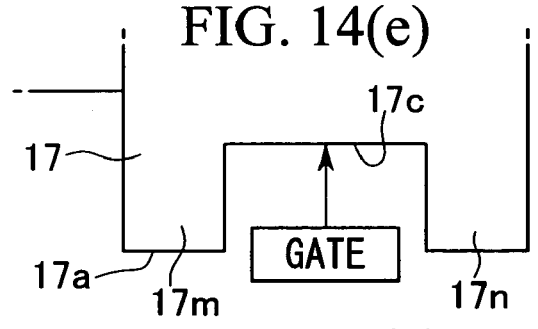
Figure 14F:
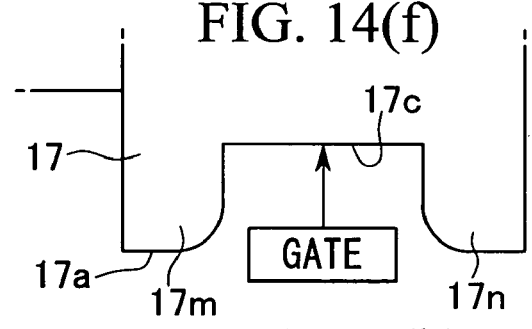
Figure 14G:
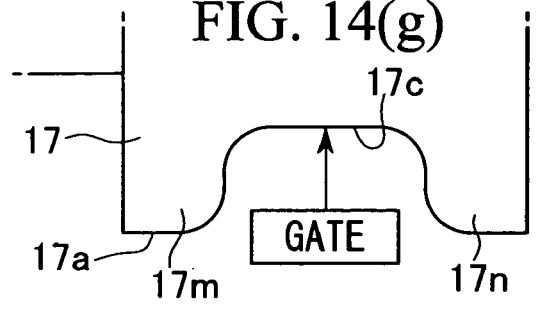
Figure 14H:
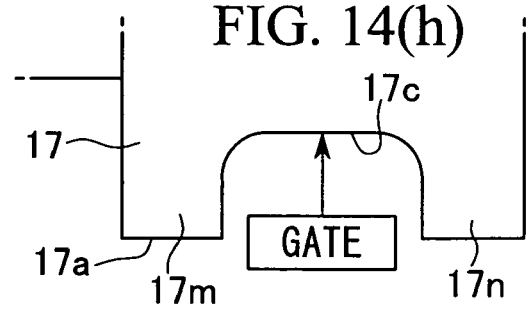

In FIGS. 14(e) to 14(h), the concave portion 17c is formed by cutting the foregoing side surface 17a so as to leave the front tip corner portion 17m of the foregoing side surface 17a in the connector connection direction and the rear tip corner portion 17n of the foregoing side surface 17a in the connector connection direction. In other words, only the middle portion of the flange portion 17 is cut to form the groove-shaped concave portion 17c. In FIG. 14(e), the groove-shaped concave portion 17c, in which both walls are perpendicular to the side surface 17a, is formed. In FIG. 14(f), the concave portion 17c, in which the edges of the groove are a convex-shaped arc and the bottom of the groove is perpendicular to each edge, is formed. In FIG. 14(g), the concave portion 17c, in which both edges of the groove are a convex-shaped arc and the bottom of the groove is a concave-shaped arc, is formed. In FIG. 14(h), the concave portion 17c, in which the edges of the groove are perpendicular to the side surface 17a and the bottom of the groove is a concave-shaped arc, is formed.

With this constitution in which the concave portion 17c is formed between the front tip corner portion 17m of the foregoing side surface 17a in the connector connection direction and the rear tip corner portion 17n of the foregoing side surface 17a in the connector connection direction by cutting the side surface 17a so as to leave the front tip corner portion 17m and the rear tip corner portion 17n, when the ferrule body 11 is accommodated, for example, in the housing of the MPO optical connector or the like, both of the front tip corner portion 17m and the rear tip corner portion 17n in the connector connecting direction, which slide on the inner wall of the housing, can function as a guide in the sliding direction. Therefore, both of the corner portions 17m and 17n can function as the long guide in the sliding direction substantially over the whole length of the connector connecting direction on the side surface 17a of the flange portion 17, which connects both of the corner portions 17m and 17n. Thus, it is possible to more effectively prevent the tip portion, where the connector connecting end face 6 is formed, from deflecting in the right and left direction relative to the connector connecting direction, and the accommodation position of the optical ferrule 11 in the housing can be more stably secured.

Figure 15:
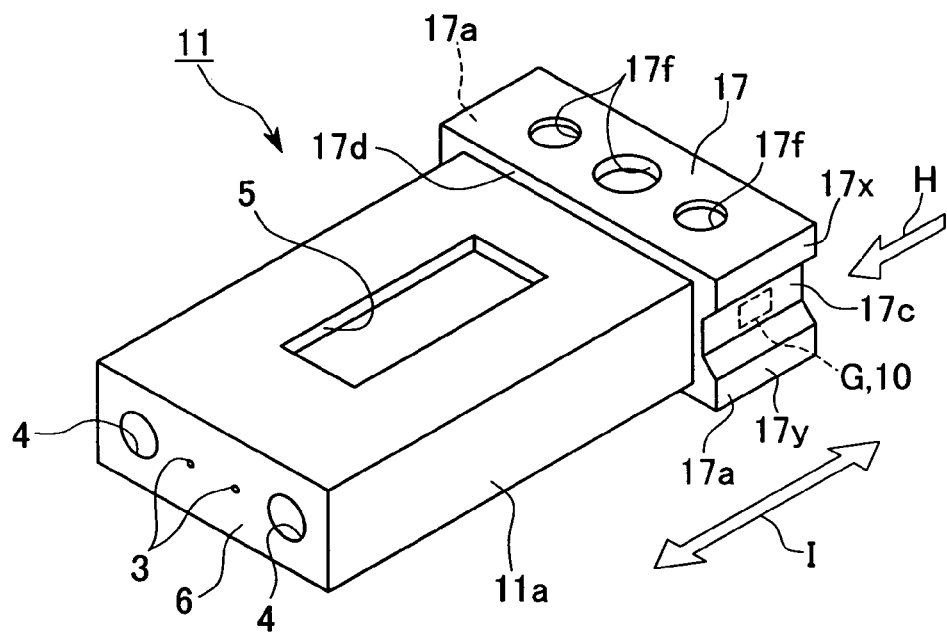
FIG. 15 is a perspective view showing another modification of the concave portion in the optical ferrule of the present invention.
Figure 16:
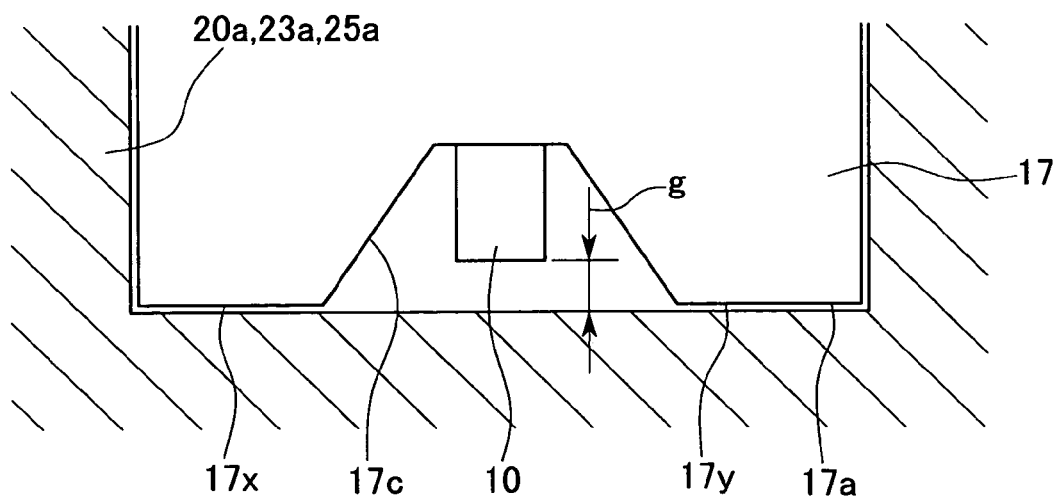
FIG. 16 is a partially enlarged view when the concave portion of this modification is viewed from the arrow direction H of FIG. 15.
Figure 17A:
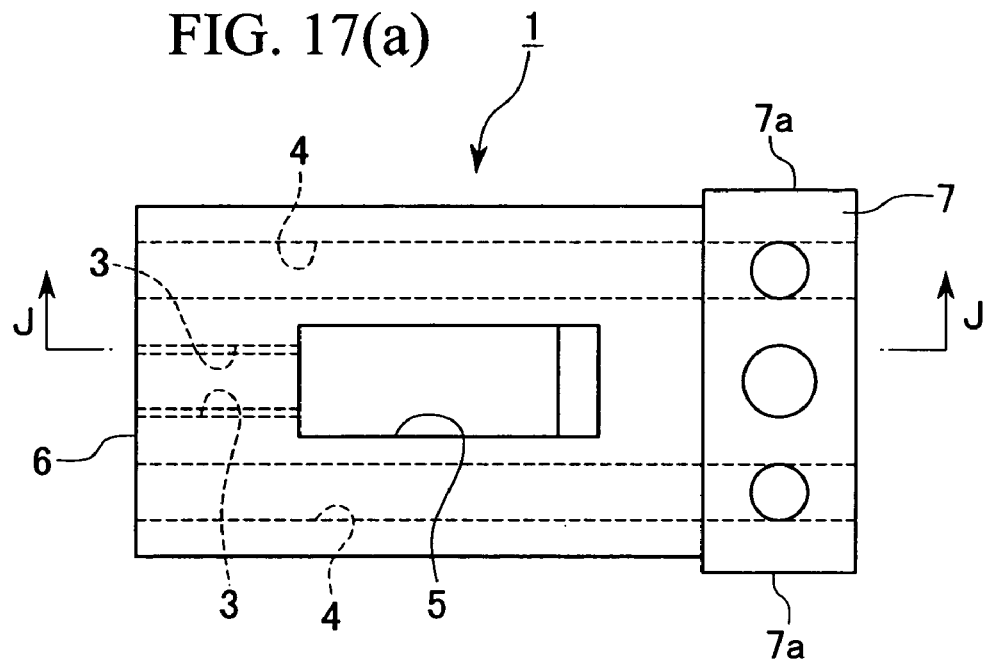
FIGS. 17(a), 17(b) and 17(c) are views showing a conventional optical ferrule.
Figure 17B:
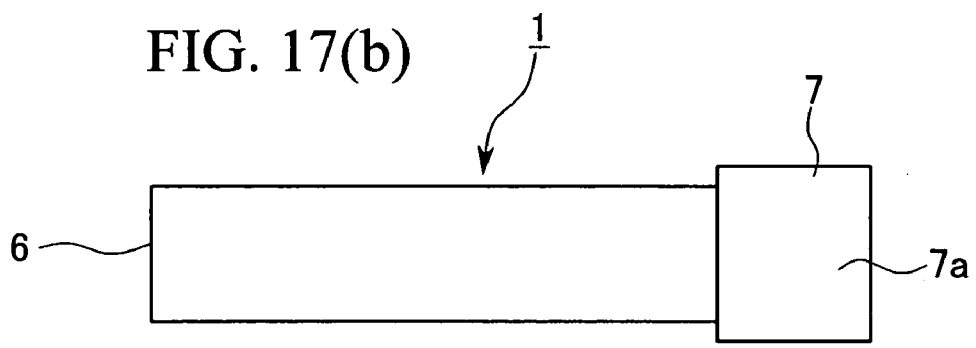
Figure 17C:
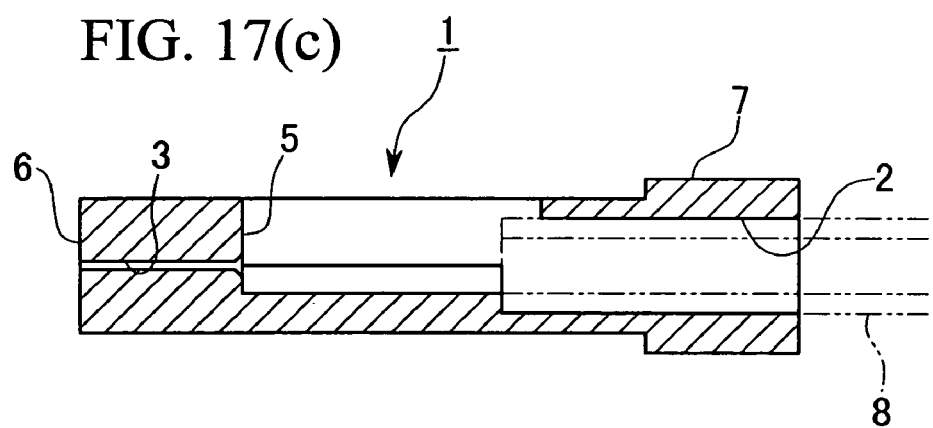
Figure 18:
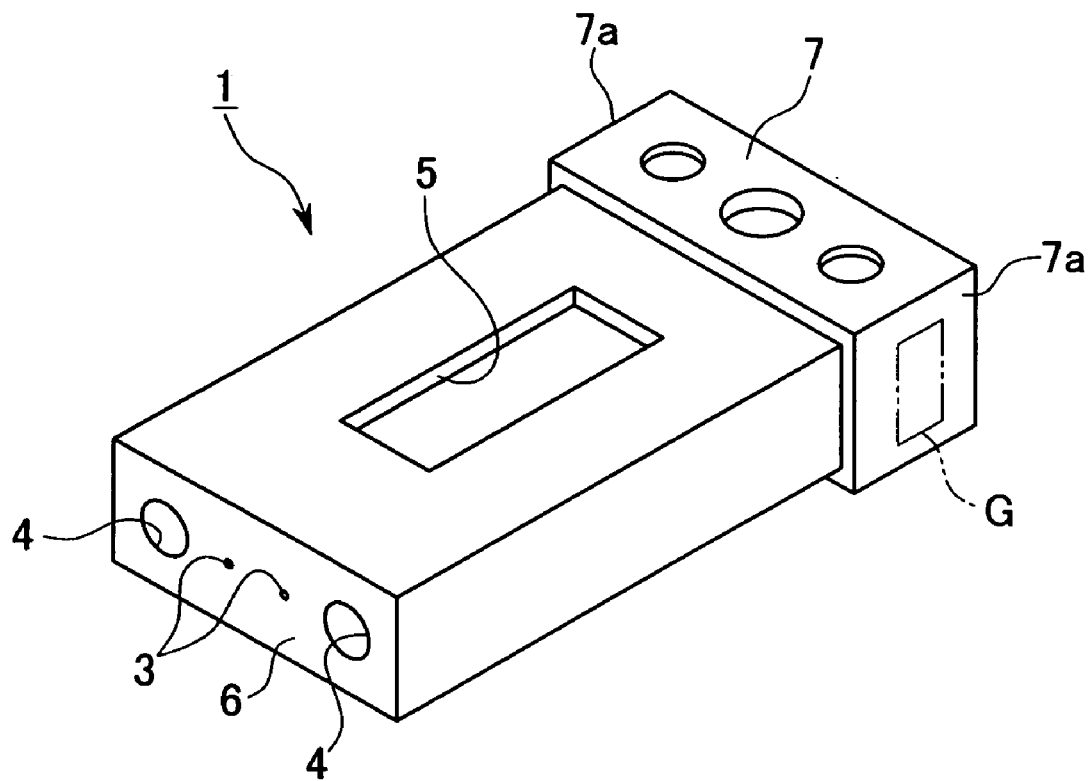
FIG. 18 is a perspective view showing the conventional optical ferrule.

Another modification of the concave portion in the optical ferrule (ferrule body 11) of the present invention is shown in FIGS. 15 and 16. FIG. 15 is a perspective view of this optical ferrule, and FIG. 16 is a partially enlarged view when the concave portion of the optical ferrule is viewed from the direction of the arrow H. Note that in FIGS. 15 and 16, the same constituent components as those of the ferrule body 11 shown in FIG. 3 are denoted by the same reference numerals, and descriptions for them are omitted.

In this modification, the concave portion 17c has a constitution in which the concave portion 17c is formed to be groove-shaped so as to extend over the whole length of each side surface 17a of the flange portion 17 along the connector connecting direction. Specifically, the groove-shaped concave portion 17c is formed at a position sandwiched between upper and lower end corner portions 17x and 17y so as to be parallel to the longitudinal direction of the optical ferrule (a longitudinal direction of the ferrule body 11), in the visual line of FIG. 15. Note that the position of the foregoing gate is shown in FIG. 15 by reference symbol G, and the position of the foregoing flash is shown in FIG. 16 by reference numeral 10.

As a metal mold for molding the ferrule body 11 of the optical ferrule in this modification, the foregoing metal mold 20' having the structure in which the ferrule body 11 is sandwiched from the upper and lower sides in the thickness direction as described with reference to FIG. 4 is not used, but a metal mold (not shown) having a parting structure in which a plane including the surface of the shoulder portion 17b of the flange portion 17 is a parting plane should be used. In this case, to draw out the molded ferrule body 11 from this metal mold, the ferrule body 11 is drawn out in the direction of the arrow I of FIG. 15, that is, in the direction parallel to the groove-shaped concave portion 17c, using the foregoing parting plane as a boundary. Since parting lines are not formed in the external periphery surface 11a of the ferrule body 11 formed in such a manner compared to the case where the ferrule body 11 is molded by use of the foregoing metal mold 20', the metal mold having a parting structure is more preferable.

FIG. 16 shows a partially enlarged view of the foregoing groove-shaped concave portion 17c, viewed from the direction of the arrow H of FIG. 15, when the ferrule body 11 molded in such a manner is accommodated in each of the housings 20a and 23a of the foregoing RJ optical connector 20 and 23 or the housing 25a of the foregoing MPO optical connector 25. As shown in FIG. 16, when the ferrule body 11 is allowed to slide relative to the various kinds of housings in the perpendicular direction to the drawing of FIG. 16, the end face of the flash 10 cut never protrudes from the upper and lower corner portions 17x and 17y to the outside, and hence the gap having the dimension g can be kept between the inner surface of each of the various kinds of housings and the end face of the flash 10, so that hitching on the flash never occurs. Accordingly, also in the optical ferrule of this modification, polishing of the side surface 17a of the flange portion 17 that has been heretofore performed is unnecessary, and a large number of ferrule bodies 11 (optical ferrule) can be automatically manufactured without requiring much manpower. Furthermore, since the foregoing upper and lower corner portions 17x and 17y remain over the whole length of the flange portion 17 in this modification, the foregoing upper and lower corner portions 17x and 17y can function as a long guide in the connector connecting direction (sliding direction). Therefore, it is possible to prevent the tip portion, where the connector connecting end face 6 is formed, from deflecting in the right and left directions relative to the connector connecting direction more effectively, and the accommodation position of the optical ferrule 11 in the housing can be stably secured. In this modification, though a groove-shaped concave portion 17c is formed in each of both side surfaces 17a, the formation position of the concave portion 17 is not limited to this, and a constitution in which the concave portion 17c is formed only in any one of both side surfaces 17a may be adopted. Furthermore, a constitution in which the groove-shaped concave portion 17c is formed in each of the foregoing upper and lower surfaces of the flange portion 17 or in any one of both of the foregoing upper and lower surfaces thereof, may be adopted.

Although the ferrule body 11 (optical ferrule) of this embodiment and the ferrule body 11 of each modification were described for a two-core optical ferrule, the number of cores of the optical fibers is an optional value such as four and eight. The ferrule body 11 may also be applied to a single-core optical ferrule if necessary.

Although the ferrule body 11 (optical ferrule) of this embodiment and the ferrule body 11 of each modification have been described using the MT type ferrule body as an example, the present invention is not limited to this, and the present invention may be applied to another type of optical ferrule.

As a material of the ferrule bodies 11 of this embodiment and each modification, a PPS thermoplastic resin containing filler should be adopted because of its applicability to continuous injection molding, in order to increase the manufacturing efficiency. On the contrary, for heat-hardening resin such as epoxy, transfer molding is often used in general, and the manufacturing steps become somewhat complicated as compared to PPS resins, resulting in comparatively low manufacturing efficiency. In order to make products inexpensive, it can be said that PPS thermoplastic resin is more preferable. However, from another point of view, epoxy resins and PPS resins show become black by adding carbon thereto, and there is little difference between their appearances. Therefore, for example, existence of the concave portion 17c can be used as an identification mark for indicating that the ferrule body is formed of a PPS resin.

As the optical fiber that is inserted in the ferrule bodies 11 of this embodiment and each modification, not only optical fibers formed of glass, but also optical fibers formed of plastic are included.

Furthermore, in the ferrule bodies 11 of this embodiment and each modification, though each concave portion 17c and the gate G are provided in each of side surface of the flange portion 17, the constitution of the ferrule body 11 is not limited to this, but each concave portion 17c and the gate G may be formed any one of the both sides of the flange portion 17.

In all of the above embodiments, the position of the concave portion where the gate is disposed exists in the flange portion. However, since the gist of the present invention is to locate the position of the gate in the concave portion, the position of the concave portion is not always limited in the flange portion. As long as the concave portion is provided at a position where the mechanical functions and optical characteristics as the optical ferrule are not impaired when the optical ferrule is accommodated in the optical connector housing, the concave portion may be provided at an optional position.

Although the preferred embodiments of the present invention have been described in detail, it should be understood that various changes, substitutions and alternations can be made therein without departing from spirit and scope of the invention as defined by the appended claims.

What is claimed is:

1. An optical ferrule comprising a ferrule body; wherein a concave portion in which a gate for resin molding is disposed is formed in said ferrule body, and a depth of said concave portion is deeper than a height of a flash which is formed in said concave portion as a result of said resin molding.

2. The optical ferrule according to claim 1, wherein an optical fiber insertion opening portion for inserting an optical fiber, an optical fiber insertion hole for inserting an end of said optical fiber which is inserted in said optical fiber insertion opening portion, and a guide pin hole for inserting a guide pin for guiding said ferrule body to a proper position, are formed in said ferrule body so as to position said optical fiber so as to position said optical fiber so as to position said optical fiber insertion hole in a tip end portion thereof.

3. The optical ferrule according to claim 2, wherein a flange portion protruding from an external periphery surface of said ferrule body to an outside is provided in a rear end portion of said ferrule body opposite to said tip end portion, and said concave portion is formed in an external surface of said flange portion.

4. The optical ferrule according to claim 3, wherein said flange portion has a rectangular shape when viewed from said rear end portion, and said concave portion is formed in at least one of right and left side surfaces of the external periphery of said flange portion.

5. The optical ferrule according to claim 4, wherein said concave portion is formed so as to extend from said side surface to a rear end corner of said rear end portion.

6. The optical ferrule according to claim 5, wherein a linear dimension (s) of said flange portion obtained by excluding said concave portion is set to 0.3 mm or more.

7. The optical ferrule according claim 4, wherein said concave portion is formed between both corner portions of said side surface which extend along an insertion direction of said optical fiber.

8. The optical ferrule according to claim 4, wherein said concave portion is formed in a groove shape extending over a whole length of said flange portion along an insertion direction of said optical fiber.

9. The optical ferrule according to claim 3, wherein said flange portion has a rectangular shape when viewed from said rear end portion, and said concave portion is formed in at least one of upper and lower side surfaces of the external periphery surface of said flange portion.

10. The optical ferrule according to claim 9, wherein said concave portion is formed in a groove shape extending over a whole length of said flange portion along an insertion direction of said optical fiber.

11. The optical ferrule according to claim 1, wherein said concave portion is formed at a portion other than a flange portion of said ferrule body.

12. An optical ferrule comprising a ferrule body, wherein a concave portion is formed for confirming confirmation factors such as a material of said ferrule body or sorts of optical fiber held in said ferrule body; and said concave portion is formed in a flange portion of said ferrule body, and a gate for resin molding is disposed in said concave portion.

* * * * *

UNITED STATES PATENT AND TRADEMARK OFFICE
CERTIFICATE OF CORRECTION

| | |
|---|---|
| PATENT NO. | : 7,232,261 B1 |
| APPLICATION NO. | : 09/720235 |
| DATED | : June 19, 2007 |
| INVENTOR(S) | : Akito Nishimura et al. |

It is certified that error appears in the above-identified patent and that said Letters Patent is hereby corrected as shown below:

Title Page; items (12) and (75);
The last name of the first inventor listed on the patent cover sheet is misspelled. The name should be changed from "Nishumura" to --Nishimura--. Please see the attached official US Patent Office filing receipt and the attached marked-up version of the cover sheet illustrating the requested correction.

Column 16, lines 42 to 44, "so as to position said optical fiber so as to position said optical fiber so as to position said optical fiber" should be changed to --so as to position said optical fiber--.

Column 16, line 62, "according claim 4" should be changed to --according to claim 4--.

Signed and Sealed this

Twentieth Day of May, 2008

JON W. DUDAS
*Director of the United States Patent and Trademark Office*